United States Patent
Yu et al.

(10) Patent No.: US 10,502,991 B2
(45) Date of Patent: Dec. 10, 2019

(54) ORIGAMI DISPLAYS AND METHODS FOR THEIR MANUFACTURE

(71) Applicant: Arizona Board of Regents on behalf of Arizona State University, Scottsdale, AZ (US)

(72) Inventors: Hongyu Yu, Chandler, AZ (US); Hanqing Jiang, Chandler, AZ (US)

(73) Assignee: THE ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 15/017,383

(22) Filed: Feb. 5, 2016

(65) Prior Publication Data
US 2016/0231784 A1    Aug. 11, 2016

Related U.S. Application Data

(60) Provisional application No. 62/112,533, filed on Feb. 5, 2015.

(51) Int. Cl.
*G02F 1/1333* (2006.01)
*G09F 9/30* (2006.01)

(52) U.S. Cl.
CPC ........ *G02F 1/133305* (2013.01); *G09F 9/301* (2013.01); *G09G 2380/02* (2013.01)

(58) Field of Classification Search
CPC .............. G02F 1/133305; G09F 9/301; G09G 2380/02
See application file for complete search history.

(56) References Cited

U.S. PATENT DOCUMENTS

| 4,922,059 | A |   | 5/1990 | Walker et al. |
| 5,008,496 | A | * | 4/1991 | Schmidt ............... H05K 1/0278 174/254 |
| 5,115,344 | A |   | 5/1992 | Jaskie |
| 5,121,297 | A | * | 6/1992 | Haas .................... H05K 3/4691 174/254 |

(Continued)

FOREIGN PATENT DOCUMENTS

| CN | 1610168 | 4/2005 |
| KR | 20100131593 A | 12/2010 |

(Continued)

OTHER PUBLICATIONS

Sant et al., "An in situ heater for a phase-change-material-based actuation system," J. Micromech. Microeng. 2. 085-39 (2010).

(Continued)

*Primary Examiner* — David M Sinclair
*Assistant Examiner* — Theron S Milliser
(74) *Attorney, Agent, or Firm* — Michael Best & Friedrich LLP

(57) ABSTRACT

A flexible electronic display is provided. The display includes a substrate having a plurality of rigid portions, at least one display circuit positioned on a surface of each of the plurality of rigid portions, and at least one flexible interconnect electrically connected to the at least one display circuit. The at least one interconnect is flexible such that each of the plurality of rigid portions may be folded or stretched relative to one another.

13 Claims, 15 Drawing Sheets

(56) References Cited

U.S. PATENT DOCUMENTS

| | | | | |
|---|---|---|---|---|
| 5,168,384 | A | * | 12/1992 | Genba .................. G02F 1/13452 348/790 |
| 5,519,596 | A | * | 5/1996 | Woolverton .......... F21S 48/215 257/E25.028 |
| 5,648,771 | A | | 7/1997 | Halgren et al. |
| 5,903,440 | A | * | 5/1999 | Blazier ................ H05K 1/0278 174/254 |
| 5,969,783 | A | * | 10/1999 | Takiar .................. G02F 1/13452 257/676 |
| 6,050,962 | A | | 4/2000 | Kramer et al. |
| 6,299,337 | B1 | * | 10/2001 | Bachl ................... F21S 48/215 257/E25.028 |
| 6,384,890 | B1 | * | 5/2002 | Takiar .................. G02F 1/13452 174/254 |
| 6,455,931 | B1 | | 9/2002 | Hamilton, Jr. et al. |
| 6,476,733 | B1 | | 11/2002 | Amiri |
| 6,482,540 | B1 | | 11/2002 | Gozdz et al. |
| 6,584,857 | B1 | | 7/2003 | Furlani et al. |
| 6,695,457 | B2 | | 2/2004 | van Drieenhuizen et al. |
| 6,880,955 | B2 | * | 4/2005 | Lin ........................ H05K 1/189 362/237 |
| 6,936,855 | B1 | * | 8/2005 | Harrah .................... F21K 9/00 257/59 |
| 7,201,511 | B2 | * | 4/2007 | Moriyama ............... F21K 9/00 257/668 |
| 7,215,547 | B2 | | 5/2007 | Chang et al. |
| 7,265,719 | B1 | * | 9/2007 | Moosbrugger .... H01Q 21/0025 343/700 MS |
| 7,513,664 | B2 | * | 4/2009 | Chou ..................... B60Q 1/2665 362/494 |
| 8,080,736 | B2 | | 12/2011 | DeNatale et al. |
| 8,658,904 | B2 | * | 2/2014 | Naganuma ............. H05K 1/115 174/255 |
| 9,706,646 | B2 | * | 7/2017 | Jiang ....................... H05K 1/028 |
| 2002/0094701 | A1 | | 7/2002 | Biegelsen et al. |
| 2003/0122476 | A1 | * | 7/2003 | Wang ................... H01L 51/5246 313/493 |
| 2004/0118595 | A1 | * | 6/2004 | Flammer ............... H05K 1/0278 174/254 |
| 2004/0172820 | A1 | * | 9/2004 | Lopez .................... H05K 1/028 29/847 |
| 2005/0099361 | A1 | | 5/2005 | Majer |
| 2005/0110702 | A1 | | 5/2005 | Aoki et al. |
| 2005/0280157 | A1 | | 12/2005 | Roush et al. |
| 2006/0063351 | A1 | * | 3/2006 | Jain ....................... G02F 1/1362 438/455 |
| 2006/0082298 | A1 | * | 4/2006 | Becken ................... C03C 27/06 313/512 |
| 2006/0113279 | A1 | | 6/2006 | Little |
| 2007/0090457 | A1 | * | 4/2007 | Lee .................... G02F 1/133305 257/347 |
| 2007/0166845 | A1 | | 7/2007 | Yokokawa |
| 2007/0279315 | A1 | | 12/2007 | Laves et al. |
| 2008/0093110 | A1 | * | 4/2008 | Bagung ................. H05K 1/0278 174/254 |
| 2008/0093118 | A1 | * | 4/2008 | Takahashi ............. H05K 3/4691 174/264 |
| 2008/0101070 | A1 | * | 5/2008 | Chou ....................... F21K 9/00 362/249.01 |
| 2008/0125510 | A1 | | 5/2008 | Crosby et al. |
| 2008/0158498 | A1 | * | 7/2008 | Chang ............... G02F 1/133305 349/158 |
| 2008/0179079 | A1 | * | 7/2008 | Ishii ....................... H05K 1/028 174/254 |
| 2008/0289859 | A1 | * | 11/2008 | Mikado ................. H05K 1/0281 174/254 |
| 2009/0009046 | A1 | * | 1/2009 | Oh ........................ H01L 51/5246 313/1 |
| 2009/0103295 | A1 | * | 4/2009 | Wang ....................... F21K 9/00 362/234 |
| 2009/0167171 | A1 | * | 7/2009 | Jung ..................... H01L 51/524 313/504 |
| 2009/0207560 | A1 | * | 8/2009 | Lee .................... H01L 51/5243 361/679.01 |
| 2009/0283891 | A1 | | 11/2009 | Dekker et al. |
| 2009/0297776 | A1 | | 12/2009 | Crosby et al. |
| 2009/0310209 | A1 | | 12/2009 | Aschwanden et al. |
| 2009/0310221 | A1 | | 12/2009 | Aschwanden |
| 2010/0053207 | A1 | | 3/2010 | Cohen et al. |
| 2010/0143677 | A1 | | 6/2010 | Lee et al. |
| 2010/0149640 | A1 | | 6/2010 | Paek et al. |
| 2010/0307705 | A1 | | 12/2010 | Rahm et al. |
| 2011/0096545 | A1 | * | 4/2011 | Chang ....................... F21S 4/28 362/249.02 |
| 2011/0227822 | A1 | | 9/2011 | Shai |
| 2011/0228536 | A1 | * | 9/2011 | Im ........................ F21S 48/1109 362/249.06 |
| 2012/0143525 | A1 | | 6/2012 | Chen et al. |
| 2012/0146050 | A1 | | 6/2012 | Adam et al. |
| 2012/0168009 | A1 | * | 7/2012 | Chen ....................... G09F 9/301 137/560 |
| 2012/0170244 | A1 | * | 7/2012 | Kwon ................... G06F 1/1637 361/829 |
| 2012/0202101 | A1 | | 8/2012 | Jeda |
| 2012/0212820 | A1 | | 8/2012 | Jiang et al. |
| 2012/0292504 | A1 | | 11/2012 | Nojima |
| 2014/0204300 | A1 | * | 7/2014 | Park .................. G02F 1/133305 349/41 |
| 2015/0342050 | A1 | * | 11/2015 | Jiang .................... H05K 1/0278 361/749 |
| 2016/0313478 | A1 | * | 10/2016 | Lee ....................... G02B 5/0242 |

FOREIGN PATENT DOCUMENTS

| | | |
|---|---|---|
| WO | 01/94253 A2 | 12/2001 |
| WO | WO 03-021679 | 3/2003 |
| WO | WO 2014029908 | 2/2014 |
| WO | WO 2014113489 | 7/2014 |

OTHER PUBLICATIONS

Yang et al., "A latchable microvalve using phase change of paraffin wax," Sensors and Actuators A 134, pp. 194-200 (2007).

International Search Report for PCT Application No. PCT/US2014/011710, dated May 12, 2014.

Hu, L.; Cui, H. Energy Environ. Sci. 2012, 6423-6435.

Huang, J.; Zhu, H.; Chen, Y.; Preston, C.; Rohrbach, K.; Cumings, J.; Hu, L. ACS Nano 2013, 2106-2113.

Dragoman, M.; Flahaut, E.; Dragoman, D.; Al Ahmad, M.; Plana, R. Nanotechnology 2009, 375203.

Liu, H.; Crooks, R. M. Anal. Chem. 2012, 2528-2532.

Lankelma, J.; Nie, Z.; Carrilho, E.; Whitesides, G. M. Anal. Chem. 2012, 4147-4152.

Liu, H.; Crooks, R. M. J. Am. Chem. Soc. 2011, 17564-17566.

Dungchai, W.; Chailapakul, O.; Henry, C. S. Anal. Chem. 2009, 5821-5826.

Martinez, A. W.; Phillips, S. T.; Whitesides, G. M.; Carrilho, E. Anal. Chem. 2010, 3-10.

Siegel, A. C.; Phillips, S. T.; Wiley, B. J.; Whitesides, G. M. Lab Chip 2009, 2775-2781.

Hu, L.; Zheng, G.; Yao, J.; Liu, N.; Weil, B.; Eskilsson, M.; Kambulut, E.; Ruan, Z.; Fan, S.; Bloking, J. T.; McGehee, M. D.; Wagberg, L.; Cui, Y. Energy Environ. Sci. 2013, 513-518.

Russo, A.; Ahn, B. Y.; Adams, J. J.; Duoss, E. B.; Bernhard, J. T.; Lewis, J. A. Adv. Mater. 2011, 3426-3430.

Yuan, L.; Yao, B.; Hu, B.; Huo, K.; Chen, W.; Zhou, J. Energy Environ. Sci. 2013, 470-476.

Olsson, H.; Carlsson, D. O.; Nystrom, G.; Sjodin, M.; Nyholm, L.; Stromme, M. J. Mater. Sci. 2012, 5317-5325.

Razaq, A.; Nyholm, L.; Sjödin, M.; Strømme, M.; Mihranyan, A. Adv. Energy Mater. 2012, 445-454.

Jabbour, L.; Destro, M.; Chaussy, D.; Gerbaldi, C.; Penazzi, N.; Bodardo, S.; Beneventi, D. Cellulose 2013, 571-582.

Chun, S. J.; Choi, E. S.; Lee, E. H.; Kim, J. H.; Lee, S. Y.; Lee, S. Y. J. Mater. Chem. 2012, 16618-16626.

(56) References Cited

OTHER PUBLICATIONS

Xu, S.; Zhang, Y.; Cho, J.; Lee, J.; Huang, X.; Jia, L.; Fan, J. A.; Su, Y.; Su, J.; Zhang, H.; Cheng, H.; Lu, B.; Yu, C.; Chuang, C.; Kim, T. I.; Song, T.; Shigeta, K.; Kang, S.; Dagdeviren, C.; Petrov, I.; Braun, P. V.; Huang, Y.; Paik, U.; Rogers, R. A. Nat. Commun. 2013, 1543.
Jost, K.; Perez, C. R.; McDonough, J. K.; Presser, V.; Heon, M.; Dion, G.; Gogotsi, Y. Energy Environ. Sci. 2011, 5060-5067.
Sun, C.; Zhu, H.; Baker, E. B., III; Okada, M.; Wan, J.; Ghemes, A.; Inoue, Y.; Hu, L.; Wang, Y. Nano Energy 2013, DOI: 10.1016/j.nanoen.2013.03.020.
Liu, Y.; Gorgutsa, S.; Santato, C.; Skorobogatiy, M. J. Electrochem. Soc. 2012, A349-A356.
Hu, L.; Choi, J. W.; Yang, Y.; Jeong, S.; LaMantia, F.; Cui, L. F.; Cui, Y. Proc. Natl. Acad. Sci. U.S.A. 2009, 21490.
Hu, L.; Wu, H.; La Mantia, F.; Yang, Y.; Cui, Y. ACS Nano 2011, 5843-5848.
Gui, Z.; Zhu, H.; Gillette, E.; Han, X.; Rubloff, G. W.; Hu, L.; Lee, S. B. ACS Nano 2013, 6037-6046.
Kang, Y. J.; Chun, S. J.; Lee, S. S.; Kim, B. Y.; Kim, J. H.; Chung, H.; Lee, S. Y.; Kim, W. ACS Nano 2012, 6400-6406.
Kang, Y. R.; Li, Y. L.; Hou, F.; Wen, Y. Y.; Su, D. Nanoscale 2012, 3248-3253.
Weng, Z.; Su, Y.; Wang, D. W.; Li, F.; Du, J.; Cheng, H. M. Adv. Energy Mater. 2011, 917-922.
Zheng, G.; Hu, L.; Wu, H.; Xie, X.; Cui, Y. Energy Environ. Sci. 2011, 3368-3373.
Chen, P.; Chen, H.; Qiu, J.; Zhou, C. Nano Res. 2010, 594-603.
Zhong, Q.; Zhong, J.; Hu, B.; Hu, Q.; Zhou, J.; Wang, Z. L. Energy Environ. Sci. 2013, 1779-1784.
Fan, K.; Peng, T.; Chen, J.; Zhang, X.; Li, R. J. Mater. Chem. 2012, 16121-16126.
Zhang, L.; Zhou, M.; Wen, D.; Bai, L.; Lou, B.; Dong, S. Biosens. Bioelectron. 2012, 155-159.
Xie, X.; Pasta, M.; Hu, L.; Yang, Y.; McDonough, Y.; Cha, J.; Criddle, C. S.; Cui, Y. Energy Environ. Sci. 2011, 1293-1297.
Gardner, J. P.; Mather, J. C.; Clampin, M.; Doyon, R.; Greenhouse, M. A.; Hammel, H. B.; Hutchings, J. B.; Jakobsen, P.; Lilly, S. J.; Long, K. S.; Lunine, J. I.; McCaughrean, M. J.; Mountain, M.; Nella, J.; Rieke, G. H.; Rieke, M. J.; Rix, H. W.; Smith, E. P.; Sonneborn, G.; Stiavelli, M.; Stockman, H. S.; Windhorst, R. A.; Wright, G. S. Space Sci. Rev. 2006, 485-606.
Ahn, B. Y.; Shoji, D.; Hansen, C. J.; Hong, E.; Dunand, D. C.; Lewis, J. A. Adv. Mater. 2010, 2251-2254.
Wei, Z. Y.; Guo, Z. V.; Dudte, L.; Liang, H. Y.; Mandevan, L. Phys. Rev. Lett. 2013, 215501.
Schenk, M.; Guest, S. D. Proc. Natl. Acad. Sci. U.S.A. 2013, 3276.
An, B.; Benbernou, N.; Demaine, E. D.; Rus, D. Robotica 2011, 87-102. Nano Letters Letter 4973 dx.doi.org/10.1021/nl4030374 | Nano Lett. 2013, 13, 4969-4974.
Wang, C.; Nosaka, T.; Yost, B.; Zimmerman, B.; Sutton, E. D.; Kincaid, E.; Keberle, K.; Iqbal, Q. A.; Mendez, R.; Markowitz, S.; Liu, P.; Alford, T. L.; Chan, C. K.; Chan, K. S.; O'Connell, M. J. Mater. Res. Lett. 2013, 13-18.
Hawkes, E.; An, B.; Benbernou, N. M.; Tanaka, H.; Kim, S.; Demaine, E. D.; Rus, D.; Wood, R. J. Proc. Natl. Acad. Sci. U.S.A. 2010, 12441-12445.
Onal, C. D.; Wood, R. J.; Rus, D. IEEE Int. Conf. Rob. Autom. 2011, 4608-4613.
Paik, J. K. IEEE/RSJ Int. Conf. Intell. Robots Syst. 2011, 414-420.
Miura, K. Map fold a la miura style, its physical characteristics and application to the space science. In Research of Pattern Formation; Takaki, R., Ed.; KTK Scientific Publishers: Tokyo, 1994; pp. 77-90.
Nishiyama, Y. Int. J. Pure Appl. Math 2012, 269-279.
Miura, K. Method of packaging and deployment of large membranes in space; Technical Report for The Institute of Space and Astronautical Science. Report No. 618, Dec. 1985.
Gaynor, J. F.; Senkevich, J. J.; Desu, S. B. J. Mater. Res. 1996, 1842-1850.
John, J.; Li, Y.; Zhang, J.; Loeb, J. A.; Xu, Y. J. Micromech. Microeng. 2011, 105011.
Kim, E.; Tu, H.; Lv, C.; Jiang, H.; Yu, H.; Xu, Y. Appl. Phys. Lett. 2013, 033506.
Katragadda, R. B.; Xu, Y. Sens. Actuators, A 2008, 169-174.
Lunnon, W. F. Math. Comp. 1968, 192-199.
Demaine, E. D.; O'Rourke, J. A survey of folding and unfolding in computational geometry. In Combinatorial and computational geometry; Goodman, J. E., Pach, J., Welzl, E., Eds.; Mathematical Sciences Research Institute Publications: Cambridge University Press: New York, 2005; pp. 167-211.
Balkcom, D. J.; Mason, M. T. Int. J. Robot. Res. 2008, 613-627.
Song, Z. et al. 'Origami Lithium-ion batteries'. Nature Communications. Jan. 28, 2014. vol. 5. Article No. 3140. pp. 1-6.
Long, J. W. et al. 'Three-dimensional battery architectures'. Chemical Reviews. 2004. vol. 104. No. 10. pp. 4463-4492.
Cheng, Q. et al. 'Folding paper-based lithium batteries for higher areal energy densities'. Nano Letters. Sep. 23, 2013. vol. No. 10. pp. 4969-4974.
Chen Y, Au J, Kazlas P, Ritenour A, Gates H, McCreary M. Flexible active-matrix electronic ink display. Nature 423, 136-136 (2003).
Gelinck GH, et al. Flexible active-matrix displays and shift registers based on solution-processed organic transistors. Nat Mater 3, 106-110 (2004).
Kim S, et al. Low-Power Flexible Organic Light-Emitting Diode Display Device. Adv Mater 23, 3511-+ (2011).
Yoon B, Ham DY, Yarimaga O, An H, Lee CW, Kim JM. Inkjet Printing of Conjugated Polymer Precursors on Paper Substrates for Colorimetric Sensing and Flexible Electrothermochromic Display. Adv Mater 23, 5492-+ (2011).
Kim DH, et al. Stretchable and foldable silicon integrated circuits. Science 320, 507-511 (2008).
Ko HC, et al. A hemispherical electronic eye camera based on compressible silicon optoelectronics. Nature 454, 748-753 (2008).
Kim DH, et al. Epidermal Electronics. Science 333, 838-843 (2011).
Pushparaj VL, et al. Flexible energy storage devices based on nanocomposite paper. Proc Natl Acad Sci U S A 104, 13574-13577 (2007).
Scrosati B. Nanomaterials—Paper powers battery breakthrough. Nat Nanotechnol 2, 598-599 (2007).
Gao KZ, et al. Paper-based transparent flexible thin film supercapacitors. Nanoscale 5, 5307-5311 (2013).
Wang JZ, et al. Highly flexible and bendable free-standing thin film polymer for battery application. Mater Lett 63, 2352-2354 (2009).
Hu LB, Wu H, La Mantia F, Yang YA, Cui Y. Thin, Flexible Secondary Li-Ion Paper Batteries. ACS Nano 4, 5843-5848 (2010).
Ihlefeld JF, Clem PG, Doyle BL, Kotula PG, Fenton KR, Apblett CA. Fast Lithium-Ion Conducting Thin-Film Electrolytes Integrated Directly on Flexible Substrates for High-Power Solid-State Batteries. Adv Mater 23, 5663-+ (2011).
Koo M, et al. Bendable Inorganic Thin-Film Battery for Fully Flexible Electronic Systems. Nano Lett 12, 4810-4816 (2012).
Yu CJ, Masarapu C, Rong JP, Wei BQ, Jiang HQ. Stretchable Supercapacitors Based on Buckled Single-Walled Carbon Nanotube Macrofilms. Advanced Materials 21, 4793-+ (2009).
Li X, Gu TL, Wei BQ. Dynamic and Galvanic Stability of Stretchable Supercapacitors. Nano Lett 12, 6366-6371 (2012).
Hu LB, et al. Stretchable, Porous, and Conductive Energy Textiles. Nano Lett 10, 708-714 (2010).
Kuribayashi K, et al. Self-deployable origami stent grafts as a biomedical application of Ni-rich TiNi shape memory alloy foil. Mater Sci Eng A—Struct Mater Prop Microstruct Process 419, 131-137 (2006).
Belcastro S-M, Hull TC. Modeling the folding of paper into three dimensions using affine transformations. Linear Algebra and its Applications 348, 273-282 (2002).
PCT/US2014/072354 International Search Report and Written Opinion of the International Searching Authority dated Apr. 13, 2015 (15 pages).
PCT/US2015/059006 International Search Report and Written Opinion of the International Searching Authority dated Feb. 17, 2016 (7 pages).

(56) References Cited

OTHER PUBLICATIONS

Äyräs P. et al., "Diffraction Gratings in Sol-gel Films by Direct Contact Printing Using a UV-mercury Lamp" 162 Opt. Comms 215-218 (1999).
Fang Y. et al., "Resonant Waveguild Grating Biosensor for Living Cell Sensing" 91 Biophys. J. 1925-940 (2006).
Gudeman CS. et al., "Using the Grating Lite Valve Device as a Multichannel Variable Optical Attenuator (VOA) for the 1.55-µm Spectral Region" 4653 Proc. SPIE 56-61 (2002).
Albert K. Harris et al., "Silicone Rubber Substrata: A New Wrinkle in the Study of Cell Locomotion" 208 Science 177-179 (1980).
Huang R., "Kinetic Wrinkling of an Elastic Film on a Viscoelastic Substrate" 53 J. Mech. Phys. Solids 63-89 (2005).
Z. Y. Huang et al., "Nonlinear Analyses of Wrinkles in a Film Bonded to a Compliant Substrate" 53 J. Mech. Phys. Solids 2101-118 (2005).
Wilhelm T. S. Huck et al., "Ordering of Spontaneously Formed Buckles on Planar Surfaces" 16 Langmuir 3497-501 (2000).
Hanqing Jiang et al., "Finite Width Effect of Thin-films Buckling on Compliant substrate: Experimental and Theoretical Studies" 56 J. Mech. Phys. Solids 2585-598 (2008).
Cunjiang Yu et al., "Thermoresponsiveness of Integrated Ultra-Thin Silicon with Poly(N-isopropylacrylamide) Hydrogels" 32 Macromol. Rapid Commun. 820 (2011).
Cunjiang Yu et al., "Silicon Thin Films as Anodes for High-Performance Lithium-Ion batteries with Effective Stress Relaxation" 2 Adv. Energy Mater. 68 (2012).
David C. Duffy et al., "Rapid Prototyping of Microfluidic Systems in Poly(dimethylsiloxane)" 70 Anal. Chem. 4974 (1998).
Daniel H. Raguin and G. Michael Morris, "Antireflection Structured Surfaces for the Infrared Spectral Region" 32 Appl. Opt. 1154-167 (1993).
Christopher M. Stafford et al., "A Buckling-based Metrology for Measuring the Elastic Moduli of Polymetric Thin Films" 3 Nat. Mater. 545-550 (2004).
Chee Wei Wong et al., "Analog Tunable Gratings Driven by Thin-film Piezoelectric Microelectromechanical Actuators" 42 Appl. Opt. 621-626 (2003).
A. Azzam Yasseen et al., "Diffraction Grating Scanners Using Polysilicon Micromotors" 5 IEEE J. Sel. Top. Quantum Electron. 75-82 (1999).
M. Ouyang et al., "Conversion of Some Siloxane Polymers to Silicon Oxide by UV/Ozone Photochemical Processes" 12 Chem. Mater. 1591 (2000).
E. Cerda et al., "Thin Films: Wrinkling of an Elastic Sheet Under Tension" 419 Nature 579 (2002).
Christopher Harrison et al., "Sinusoidal Phase Grating Created by a Tunably Buckled Surface" 85 Appl. Phys. Lett. 4016-4018 (2004).
Ned Bowden et al., "Spontaneous Formation of Ordered Structures in Thin Films of Metals Supported on an Elastomeric Polymer" 393 Nature 146-149 (1998).
Takuya Ohzono and Masatsugu Shimomura, "Geometry-dependent Stripe Rearrangement Processes Induced by Strain on Preordered Microwrinkle Patterns" 21 Langmuir 7230-7237 (2005).
Kevin Chen et al., "Facile Large-area Photolithography of Periodic Sub-micron Structures Using a Self-formed Polymer Mask" 100 App. Phys. Lett 233503 (2012).
F.S. Chen et al., "Holographic Storage in Lithium Niobate" 13 Appl. Phys. Lett. 223 (1968).
Kahp Y. Suh et al., "A Simple Soft Lithographic Route to Fabrication of Poly(ethylene glycol) Microstructures for Protein and Cell Patterning" 25 Biomaterials 557 (2004).
Anne Horn et al., "Ordering and Printing Virus Arrays: A straightforward Way to Functionalize Surfaces" 6 Small 2122 (2010).
Jonathan G. C. Veinot et al., "Fabrication and Properties of Organic Light-Emitting "Nanodiode" Arrays" 2 Nano Lett. 333 (2002).
Yoshihiro Koide et al., "Hot Microcontact Printing for Patterning ITO Surfaces. Methodology, Morphology, Microstructure, and OLED Charge Injection Barrier Imaging" 19 Langmuir 86 (2003).
Cunjiang Yu et al., "Tunable Optical Gratings Based on Buckled Nanoscale Thin Films on Transparent Elastomeric Substrates" 96 Appl. Phys. Lett. 041111 (2010).
Zhiyong Fan et al., "Three-dimensional Nanopillar-array Photovoltaics on Low-cost and Flexible Substrates" 8 Nat. Mat. 648 (2009).
C. Vieu et al., "electron Beam Lithography: Resolution Limits and Applications" 164 Appl. Surf. Sci. 111 (2000).
Burn Jeng Lin, "Deep UV Lithography" 12 J. Vac. Sci. Technol. 1317 (1975).
Leon A. Woldering et al., "Periodic Arrays of Deep Nanopores Made in Silicon with Reactive Ion Etching and Deep UV Lithography" 19 Nanotechnology 145304 (2008).
Dong Sik Kim et al., "Laser-Interference Lithography Tailored for Highly Symmetrically Arranged ZnO Nanowire Arrays" 3 Small 76 (2007).
Johannes de Boor et al., "Three-beam Interference Lithography: Upgrading a Lloyd's Interferometer for Single-exposure Hexagonal Patterning" 34 Opt. Lett. 1783 (2009).
Ampere A Tseng et al., "Nanofabrication by Scanning Probe Microscope Lithography: A Review" 23 J. Vac. Sci. Technol. B 877 (2005).
Younan Xia et al., "Unconventional Methods for Fabricating and Patterning Nanostructures" 99 Chem. Rev. 1823 (1999).
L. Jay Guo, "Nanoimprint Lithography: Methods and Material Requirements" 19 Adv. Mater. 495 (2007).
Helmut Schift, "Nanoimprint Lithography: An Old Story in Modern Times? A Review" 26 J. Vac. Sci. Technol. B 458 (2008).
J. Y. Cheng et al., "Fabrication of Nanostructures with Long-range Order Using Block Copolymer Lithography" 81 Appl. Phys. Lett. 3657 (2002).
Tae-Woo Lee et al., "Soft-Contact Optical Lithography Using Transparent Elastomeric Stamps: Application to Nanopatterned Organic Light-Emitting Devices" 15 Adv. Funct. Mater. 1435 (2005).
John A. Rogers et al., "Using an Elastomeric Phase Mask for Sub-100nm Photolithography in the Optical Near Field" 70 Appl. Phys. Lett. 2658 (1997).
Dong Qin et al., "Photolithography with Transparent Reflective Photomasks" 16 J. Vac. Sci. Technol. B 98 (1998).
Zhi-Yuan Li et al., "Optimization of Elastomeric Phase Masks for Near-field Photolithography" 78 Appl. Phys. Lett. 2431 (2001).
John A. Rogers et al., "Generating ~90 Nanometer Features Using Near-field Contact-mode Photolithography with an Elastomeric Phase Mask" 16 J. Vac. Sci. Technol. B 59 (1998).
Daniel J. Shir et al., "Three-Dimensional Nanofabrication with Elastomeric Phase Masks" 111 J. Phys. Chem. B 12945 (2007).
Alexandra Schweikart and Andreas Fery, "Controlled Wrinkling as a Novel Method for the Fabrication of Patterned Surfaces" 165 Microchim. Acta 249 (2009).
Won Mook Choi et al., "Biaxially Stretchable "Wavy" Silicon Nanomembranes" 7 Nano Lett. 1655 (2007).
Kirill Efimenko et al., "Nested Self-similar Wrinkling Patterns in Skins" 4 Nat. Mater. 293 (2005).
Byung-Ho Jo et al., "Three-Dimensional Micro-Channel Fabrication in Polydimethylsiloxane (PDMS) Elastomer" 9 J. Microelectromech. Syst. 76 (2000).
Conghua Lu et al., "A Lithography-free Method for Directed Colloidal Crystal Assembly Based on Wrinkling" 3 Soft Matter 1530 (2007).
Heinz Schmid et al., "Preparation of Metallic Films on Elastomeric Stamps and their Application for Contact Processing and Contact Printing" 13 Adv. Funct. Mater. 145 (2003).
Cheryl S. Selvanayagam et al., "Nonlinear Thermal Stress/Strain Analyses of Copper Filled TSV (Through Silicon Via) and their Flip-Chip Microbumps" 32 III Trans. Adv. Pack. 720 (2009).
James S. Sharp and Richard. A. L. Jones, "Micro-buckling as a Route Towards Surface Patterning" 14 Adv. Mater. 799 (2002).
Pimpon Uttayarat et al., "Topographic Guidance of endothelial Cells on Silicone Sufraces with Micro- to Nanogrooves: Orientation of Actin Filaments and Focal Adhesions" 75 J. Biomed. Mater. Res. A 668 (2005).

(56) References Cited

OTHER PUBLICATIONS

Cunjiang Yu and Hanquing Jiang, "Forming Wrinkled Stiff Films on Polymeric Substrates at Room Temperature for Stretchable Interconnects Applications" 519 Thin Solid Films 818 (2010).

C. Yu et al., "Stretchable Supercapacitors Based on Buckled Single-Walled Carbon Nanotube Macrofilms", Adv. Mater., 21, pp. 4793-4797 (2009).

C. Yu et al., "A stretchable temperature sensor based on elastically buckled thin film devices on elastomeric substrates", Appl. Phys. Lett. 95, 141902 (2009).

H. Jiang et al., Finite deformation mechanics in buckled thin films on compliant supports, PNAS, vol. 104., No. 40, pp. 15607-15612 (2007).

D.-Y. Khang et al., "A Stretchable Form of Single-Crystal Silicon for High-Performance Electronics on Rubber Substrates", Science, vol. 311 pp. 208-212 (2006).

S.P. Lacour et al., "Stretchable Interconnects for Elastic Electronic Surfaces", Proc. IEEE, vol. 93, No. 8, pp. 1459-1467 (2005).

International Search Report and Written Opinion for PCT/US2014/065776, dated Apr. 22, 2015.

T Ma et al., "Micro-strain sensing using wrinkled stiff thin films on soft substrates as tunable optical grating", Optics Express, vol. 21, No. 10, pp. 11994-12001 (2013).

X. Jiang et al., "Controlling Mammalian Cell Spreading and Cytoskeletal Arrangement with Conveniently Fabricated Continuous Wavy Features on Poly(dimethylsiloxane)", Langmuir 18(8), 3273-3280 (2002).

S. Wagner et al., "Electronic skin: architecture and components," Physica E 25(2-3), 326-334 (2004).

S. P. Lacour et al., "Design and performance of thin metal film interconnects for skin-like electronic circuits," IEEE Electron Device Lett. 25(4), 179-181 (2004).

S. P. Lacour et al., "Stretchable gold conductors on elastomeric substrates," Appl. Phys. Lett. 82(15), 2404-2406 (2003).

S. P. Lacour, S. Wagner, R. J. Narayan, T. Li, and Z. Suo, "Stiff subcircuit islands of diamondlike carbon for stretchable electronics," J. Appl. Phys. 100(1), 014913 (2006).

H. Q. Jiang et al., "Mechanics of precisely controlled thin film buckling on elastomeric substrate," Appl. Phys. Lett. 90(13), 133119 (2007).

K.M. Choi et al., "A photocurable poly(dimethylsiloxane) chemistry designed for soft lithographic molding and printing in the nanometer regime," J. Am. Chem. Soc. 125(14), 4060-4061 (2003).

Song et al., "Origami 1 ithiwn-ion batteries," brochure, Nature Communications, Jan. 8, 2014, vol. 5, article No. 3140, pp. 1-6 see pp. 2-3; Methods in p. 6; figure 1.

Xu et al., "Stretchable batteries with self-similar serpentine interconnects and integrated wireless recharging systems", Nature Communications, Feb. 26, 2013, vol. 4, article No. 1543, pp. 1-8 see abstract; pp. 2-4; Methods in p. 7; figures 1-3.

PCT/US2015/052205 International Search Report and Written Opinion of the International Searching Authority dated Dec. 23, 2015 (9 pages).

PCT/US2015/068038 International Search Report and Written Opinion of the International Searching Authority dated May 4, 2016 (9 pages).

Asundi et al., "Optical strain sensor using position-sensitive detector and diffraction grating: error analysis," Optical Engineering 39.6 (2000): 1645-1651.

Chinese Patent Office Action for Application No. 201580077410.9 dated Jul. 26, 2019 (14 pages, English translation included).

\* cited by examiner

ORIGAMI DISPLAYS AND METHODS FOR THEIR MANUFACTURE

CROSS-REFERENCE TO RELATED APPLICATION

This application claims priority to U.S. Provisional Patent Application No. 62/112,533 filed on Feb. 5, 2015, the entire disclosure of which is hereby incorporated by reference.

FIELD OF THE INVENTION

This application relates to origami enabled manufacturing systems and methods and, more particularly, to systems and methods for manufacturing functional materials, structures, devices and/or systems having an adjustable size, shape and/or local structures, based on origami principles. In particular, the application relates to origami-based or foldable displays and methods for manufacturing the same.

BACKGROUND

Origami can be used to transform a flat sheet of paper, for example, into a finished sculpture through folding and sculpting techniques. Such finished sculptures can be very intricate with detailed and complex shapes. Traditional origami has been used primarily in artistic applications, but its use in other more industrial areas is being investigated.

For example, in small or micro-scale manufacturing processes, e.g., from centimeters to micrometers to nanometers), origami has been explored to form flexible compact devices. Indeed, flexible, foldable and/or stretchable electronics are emerging as an attractive and promising new industry. Such electronics can be incorporated into wearable devices, such as flexible displays, stretchable circuits, hemispherical electronic eyes, and epidermal devices, to name a few. However, only very simple folding methods and structures have been explored to fabricate such structures due to their small size. Moreover, the current material choice is limited, thereby limiting the functionality of the structure. Additionally, such structures are limited by manufacturing technology which is not scalable, has a low yield, and is expensive and fragile.

Accordingly, there is a need in the art for origami-based structures which may utilize soft and hard materials to produce wide functionality, reduce the space required, and improve portability and performance of such devices.

SUMMARY

Accordingly, a flexible electronic device is provided. One aspect of the invention is directed to a flexible electronic display which includes a substrate having a plurality of rigid portions, at least one display circuit positioned on a surface of each of the plurality of rigid portions, and at least one flexible interconnect electrically connected to the at least one display circuit. The at least one interconnect is flexible such that each of the plurality of rigid portions may be folded or stretched relative to one another.

The invention is further directed to a method for making an electronic display, including the steps of providing a top substrate and a bottom substrate, depositing at least one of a transistor, circuit, passivation layer, or electronic functional layer on the bottom substrate to form at least one rigid portion, removing at least a portion of the bottom substrate to form a creased portion, depositing at least one display layer on the bottom substrate directly adjacent to the creased portion, and binding the top substrate to the bottom substrate over a rigid portion of the electronic display such that the creased portions remain exposed.

DESCRIPTION OF THE DRAWINGS

These and other features of the preferred embodiments of the invention will become more apparent in the detailed description in which reference is made to the appended drawings wherein:

FIG. 9A illustrates an unfolded state and FIG. 9B illustrates a folded state according to one aspect of the invention;

DETAILED DESCRIPTION

Figure 1:
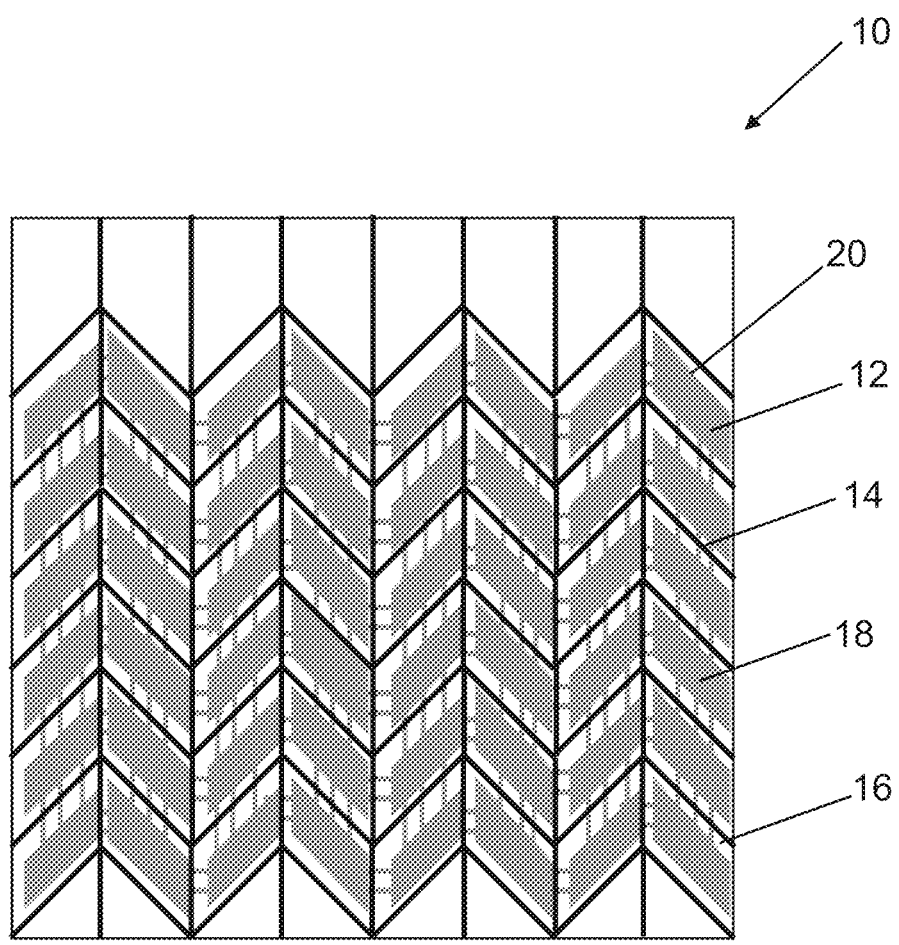
FIG. 1 is a plan view of an origami enabled manufacturing system according to one aspect of the invention.

The present invention can be understood more readily by reference to the following detailed description, examples, drawings, and claims, and their previous and following description. However, before the present devices, systems, and/or methods are disclosed and described, it is to be understood that this invention is not limited to the specific origami patterns, devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an," and "the" include plural referents unless the context clearly dictates otherwise. Thus, for example, reference to "a crease" can include two or more such creases unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

As used herein, the term "origami" refers to the art of folding in which a flat sheet is transformed into a three-dimensional shape through folding and sculpting techniques. It can, however, also refer to kirigami (in which the sheet is cut in addition to folded), or any other types of "gami", including wet-folding, modular origami and the like.

Although reference will be made herein to small or micro scale (from cm to micro to nano levels), it is understood that origami enabled manufacturing systems and methods can also be extended to a large scale. For example, in building construction, tiles can be pre-patterned in a factory using the origami principle disclosed herein and then assembled on site.

Described herein are origami enabled manufacturing systems and methods. In one aspect, the origami enabled manufacturing system can use conventional manufacturing technologies to produce fully functional materials, structures, devices and/or systems on a substantially planar substrate. When in use, the planar substrate can then be converted into a three-dimensional structure formed by origami by self-assembling and/or from external forces. The resulting three-dimensional products can provide a smaller projection area (i.e., a more compact or denser product) and higher portability and deformability. Furthermore, the capability of repeatedly folding and unfolding of the origami-formed products provides a great platform of foldable, flexible, stretchable and/or curvilinear electronics, such as stretchable/flexible solar cells, stretchable/flexible antenna and the like.

The origami-enabled manufacturing system includes a plurality of functional bodies, wherein each functional body has a plurality of side edges. The plurality of functional bodies can be arrayed in a predetermined pattern. The plurality of side edges define a plurality of creases in the predetermined pattern and at least one side edge of each functional body can be positioned in opposition to at least one side edge of another functional body in the predetermined pattern.

In one aspect, each functional body comprises a substrate. In another aspect, each functional body comprises a substrate and at least one device attached thereto or formed integrally with the substrate. The substrate can be, for example, a rigid substrate. As another example, the substrate can be a foldable and/or flexible substrate. In still another aspect, the substrate can be, for example, a material, structure, device and the like manufactured as a substantially planar shape using conventional industrial technology. In still another aspect, the functional bodies can be shaped and sized to correspond to a desired origami shape, with the side edges of the functional bodies corresponding to creases in the origami pattern.

At least one connection member may be coupled to and positioned between the opposed functional bodies. In one aspect, each connection member is in a fixed position, in which no relative movement between connected functional bodies can be allowed. In another aspect, each connection member is movable and pliable to allow for relative movement between connected functional bodies.

The origami enabled manufacturing system can be designed and formed as an array of functional bodies with at least one connection member positioned between and coupled to the functional bodies, according to one aspect. In another aspect, the connection members can be flexible and/or stretchable connection members. For example, the connection members can be electrodes, fluidic channels, mechanical hinges and the like. The interconnection between the functional bodies may include serpentine-shaped conductors. The serpentine shape allows the electronic device to be fully deformable, including but not limited to flexible, stretchable, twistable, compressible, and foldable. Methods for making functional bodies with serpentine interconnects are also provided.

With reference to FIG. 1, the origami enabled manufacturing system 10 of the invention generally includes a plurality of functional bodies 12 coupled together by a plurality of connection members 14 positioned between opposed functional bodies 12. In one aspect, each functional body 12 can include a substrate 16. For example, the substrate 16 can be a silicon substrate. In still another aspect, each functional body 12 can include a substrate 16 and at least one device 18 attached thereto or formed integrally with the substrate 16. The substrate 16 can be, for example, a foldable and/or flexible substrate. Alternatively, the substrate 16 can be a substantially rigid substrate. In still another aspect, the substrate 16 can be, for example, a material, structure, device and the like manufactured as a substantially planar shape using conventional industrial standard technology. In still another aspect, the functional bodies 12 can be shaped and sized to correspond to a predetermined pattern or array (e.g., a desired origami shape), with at least a portion of the side edges 20 of a functional body 12 corresponding to creases in the origami pattern. In another aspect, at least one side edge 20 of each functional body 12 can be positioned in opposition to at least one side edge 20 of another functional body 12 in the predetermined pattern. For example, at least one side edge 20 of each functional body 12 can be positioned adjacent to at least one side edge 20 of another functional body 12 in the predetermined pattern. As another example, at least one side edge 20 of each functional body 12 can be positioned substantially parallel to at least one side edge 20 of another functional body 12 in the predetermined pattern. Thus, the functional bodies 12 can be formed into shapes corresponding to portions of an origami pattern.

The at least one device 18 can be any material, structure, device and/or system. For example, the at least one device could be an electronic device, a pneumatic device, a hydraulic device and the like. In another example, the at least one device 18 can be a metallic material, polymeric material, a wooden material, a textile and the like. As can be appreciated, the at least one device 18 can be almost any material, structure, device and/or system capable of being attached to a substrate.

In one aspect, the at least one connection member 14 can be coupled to and positioned between opposed functional bodies 12. In an aspect, each connection member 14 can be selectively movable between a fixed position, in which no relative movement between connected functional bodies 12 can be allowed, and a pliable position, in which relative movement between connected functional bodies 12 can be allowed.

In one aspect, the origami enabled manufacturing system 10 can include a mechanism for selectively actuating the at least one connection member 14 to allow for the selective displacement of the at least one functional body 12 relative to another functional body 12. For example, the mechanism for selectively actuating the at least one connection member can include an electrode, a fluidic channel, a mechanical hinge and the like (not shown).

In a further aspect, the at least one connection member 14 can be a flexible, pliable and/or stretchable connection member. For example, the at least one connection member 14 can include an electrode, a fluidic channel, a mechanical hinge and the like. However, it is contemplated that, optionally, the at least one connection member 14 does not necessarily have to have a function other than the ability to couple two functional bodies 12 together. That is, for example and without limitation, the at least one connection member 14 can simply be a flexible material such as a flexible polymer. If the at least one connection member 14 includes a plurality of connection members, it is contemplated that each connection member can be a different or the same type of connection member. For example, a first connection member 14 could be an electrode and a second connection member 14 could be a fluidic channel, an electrode, or any other type of connection member. It is contemplated that any one or more connection members 14 coupling adjoined functional bodies 12 can include ways for selectively actuating the at least one connection member 14 to allow for the selective displacement of the at least one functional body 12 relative to another functional body 12 and, conversely, it is contemplated that any one or more connection members 14 coupling adjoined functional bodies 12 can include a flexible, non-actuating, material.

Figure 2:
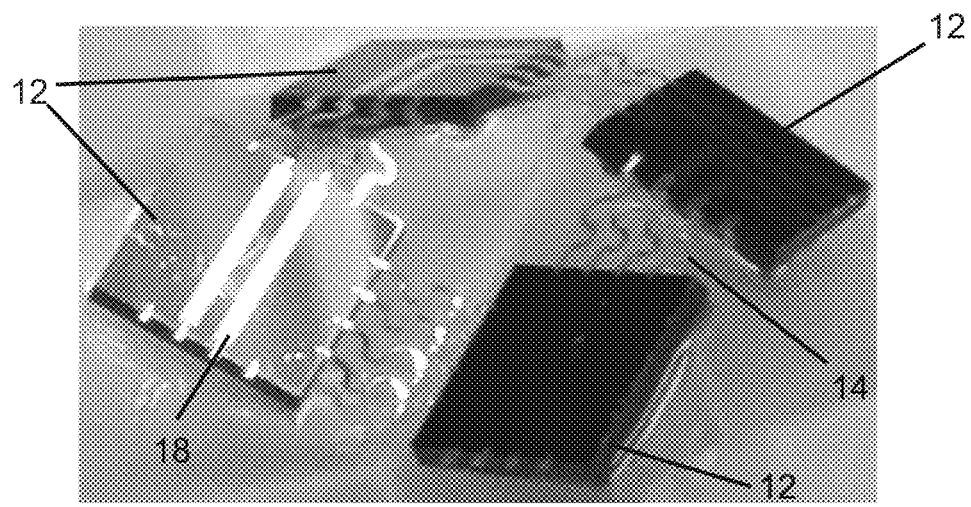
FIG. 2 is a photograph of an origami enabled manufacturing system according to one aspect of the invention.

One possible arrangement for an exemplary origami enabled manufacturing system 10 is illustrated in FIG. 2. Here, four functional bodies 12 are connected in series by four connection members 14 to form a ring-like pattern.

Figure 3:
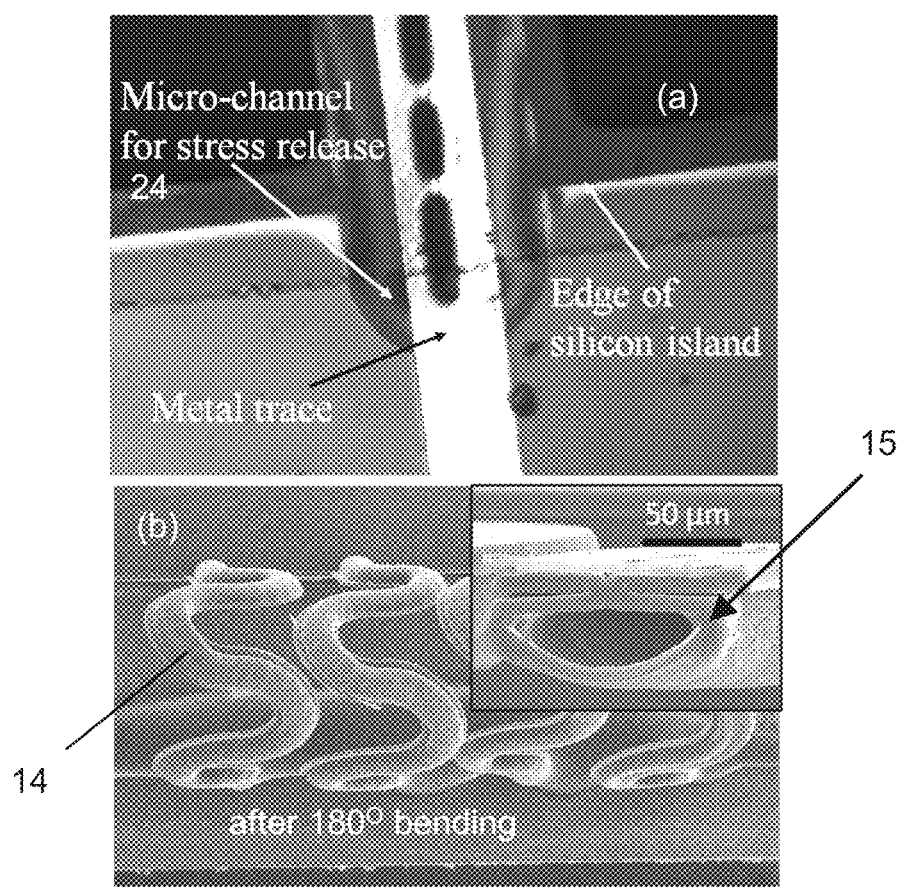
FIG. 3 is a top view of the origami enabled manufacturing system of FIG. 1, showing a connection member.

In one aspect, and with reference to FIG. 3, the at least one connection member 14 can be formed into, for example and without limitation, a substantially "S" or serpentine-shape 22. Optionally, and without limitation, it is contemplated that the at least one connection member 14 can be substantially "C" shaped, substantially "U" shaped, substantially linear and the like. In another aspect, at least one channel 24 can be defined in a portion of the at least one connection member 14 in order to relieve a portion of the stress created during bending. Further, the at least one channel 24 defined in the at least one connection member 14 can also provide more functionality, such as pneumatic driving, and fluidic interconnection between origami pieces and with functional devices, as described more fully below.

Figures 4A, 4B:
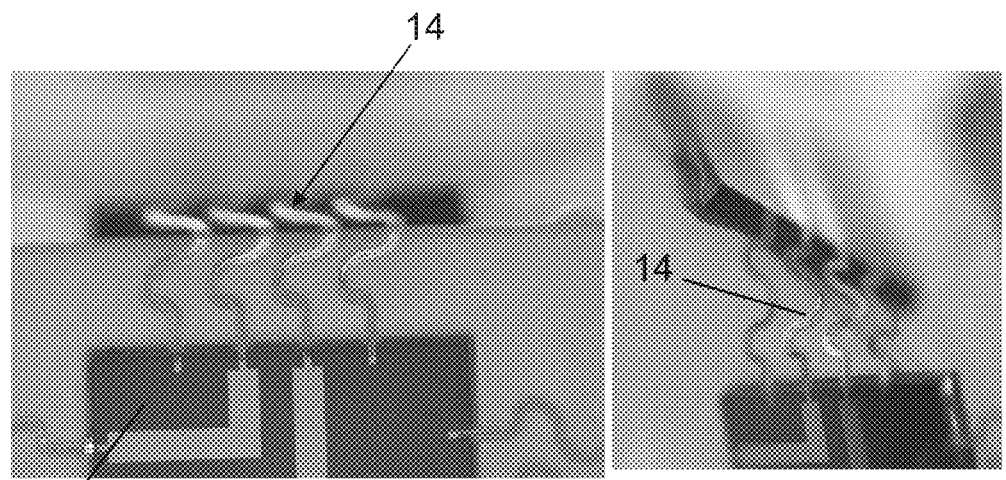
FIGS. 4A-B are top views of the origami enabled manufacturing system of FIG. 2, showing a connection member undergoing deformation.
Figure 4C:
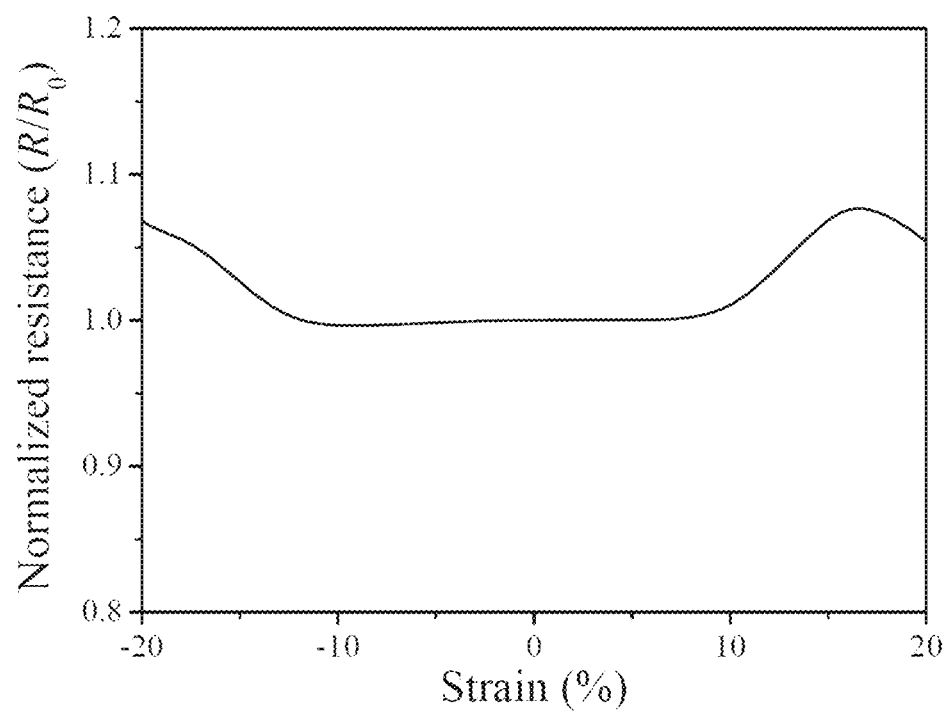
FIG. 4C is a graph illustrating the resultant changes in resistance of the connection member of FIGS. 4A-B after deformation.

Referring now to FIG. 4A-B, the "S" or serpentine-shaped connection member 14 can survive folding (FIG. 4(A)) and twisting (FIG. 4(B)) with little change in the resistance, as illustrated in the graph in FIG. 4(C). The graph in FIG. 4(C) illustrates normalized resistance as a function of strain on the connection member 14. For example, the resistance is almost unchanged when a 2×2 silicon functional body 12 connected by a serpentine connection member 14 was subjected to deformations such as folding and twisting.

In one aspect, the at least one connection member 14 can be formed from a material configured to withstand the imposed bending stress formed when adjacent and adjoined functional bodies 12 are folded together to form a desired origami pattern and/or structure. In another aspect, the at least one connection member 14 can include at least one flexible layer 15 (see FIG. 3). For example, the at least one connection member 14 can be a relatively soft material, such as a polymer, gel and the like formed into a flexible layer. As an example, the polymer can be poly-para-xylylene. As another example, the polymer can be an electrically conductive polymer. In another aspect, the at least one connection member 14 can further include at least one metal material, such as, for example, and without limitation, a metal trace, e.g., Au, Cr, Cu, Ag, Al, and the like.

In another example, the at least one connection member 14 can be formed from a plurality of layers, such as a first layer forming a top or bottom of the at least one connection member 14, or double layers on both the top and bottom of the at least one connection member 14, and/or multiple layers as necessary depending on the requirements of a particular application, like that illustrated in FIG. 3. In one aspect, the flexible layer of the at least one connection member 14 can be bonded to the functional body 12 with possible reinforced folding structures. Alternatively, a fabrication process can use soft materials (such as polymer and/or gel), or a combination of soft and hard materials to produce an enhanced folding structure only at the connection between functional bodies 12. In another aspect, the soft material can be applied as a flexible layer over a functional portion of the connection member 14 (that is, optionally, over an electrode, a fluidic channel, a mechanical hinge and the like).

After fabrication and assembly of the functional bodies 12 and the at least one connection member 14 (described below according to one aspect), the origami enabled manufacturing system 10 can be folded into the origami pattern by self-assembling and/or external forces. In one aspect, the external forces can include at least one of a thermal double layer, a shape changing polymer, a shape changing alloy, an electrochemical force, a mechanical force, an electrostatic force, a magnetic force and the like. By varying the amount and/or direction of the forces, stretchability and deformability can be realized by folding and unfolding the system along the borders between the functional bodies 12. Thus, without requiring the use of elastomeric materials, stretchability and deformability can be realized. Alternatively, the functional bodies 12 can be folded to a desired folded shape before the at least one device 18 has been bonded thereto.

The folded origami shape can be the final product, according to one aspect. If so, a package can be formed to finish the system 10 with appropriate protection and/or interfaces to couple the system to its surrounding environment. If the system will be used with repeated folding and unfolding, a suitable interface can be built to connect the system with outside environments.

Figure 5:
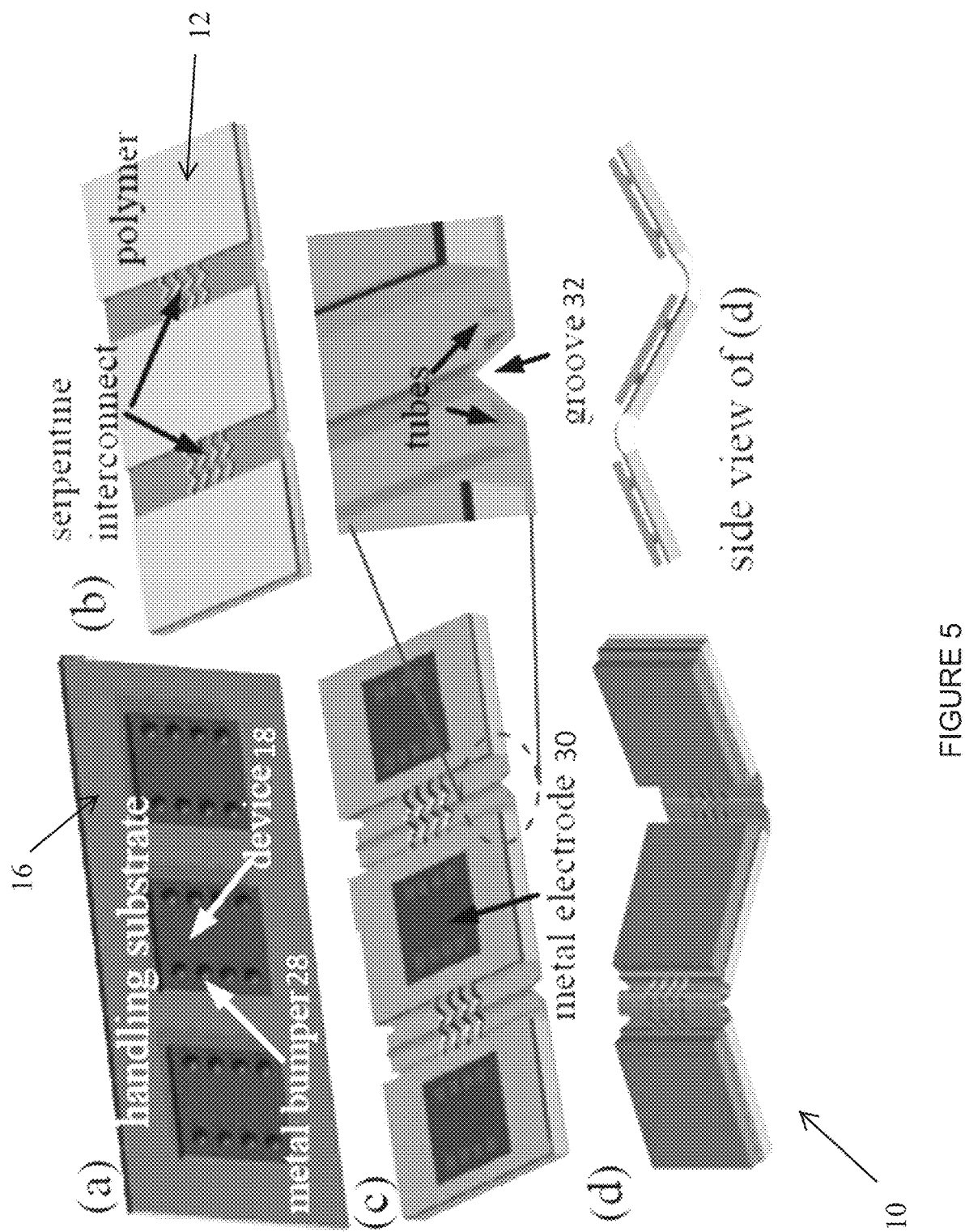
FIG. 5 is a plurality of views showing a method for forming an origami enabled manufacturing system according to one aspect of the invention.

To assemble an origami enabled manufacturing system 10, in which a stretchable and deformable electronic device is formed, in one aspect, at least one electronic device 18 can be attached to a substrate 16 as illustrated in FIG. 5. The at least one device 18 can be manufactured using any industrial process. In another aspect, the at least one device 18 can be attached to the substrate 16 with, for example and without limitation, metal bonding bumpers 28. Alternatively, silicon pieces can work as an electrical and mechanical interfacing layer to introduce another functional layer on top. The functional devices 18, manufactured using industrial standard processes as an array of pieces, are attached on a handling substrate and modified with metal bonding bumpers 38. A silicon wafer with a patterned metal layer on the top surface (which functions as interconnects) and etched creases on the bottom surface is provided. The island-interconnect structures, consisting of metal electrodes encapsulated in polymer, are fabricated and the tubes around the bottom grooves are formed for potential folding. The grooves are specifically designed for origami patterns. The functional devices and the remaining structure are then brought and bonded together. Thus, the devices and polymers with origami patterns are integrated.

In one aspect, the substrate 16 of the functional body 12 can include a silicon wafer formed with a patterned metal layer 30 on a top surface of the wafer and at least one etched groove 32 on a bottom surface of the wafer. The at least one groove on the bottom surface of the wafer can be etched per a predetermined origami pattern. In another aspect, the top and bottom surface of the wafer can be at least partially covered with a polymer, such as, for example and without limitation, parylene C, to function as the connection member 14 and a guide for folding, respectively. The at least one connection member 14 can, in this example, thus consist of metal traces encapsulated in polymer.

In an embodiment, as illustrated in FIGS. 4 and 5, the functional bodies 12 may be coupled together by one or more connection members 14 that are substantially "S" or serpentine-shaped. The serpentine-shaped connection member allows the electronic device to be fully deformable, including but not limited to flexible, stretchable, twistable, compressible, and foldable. Preferably, the serpentine-shaped connection members are formed from conductors electronically connecting the functional bodies 12.

Figure 6:
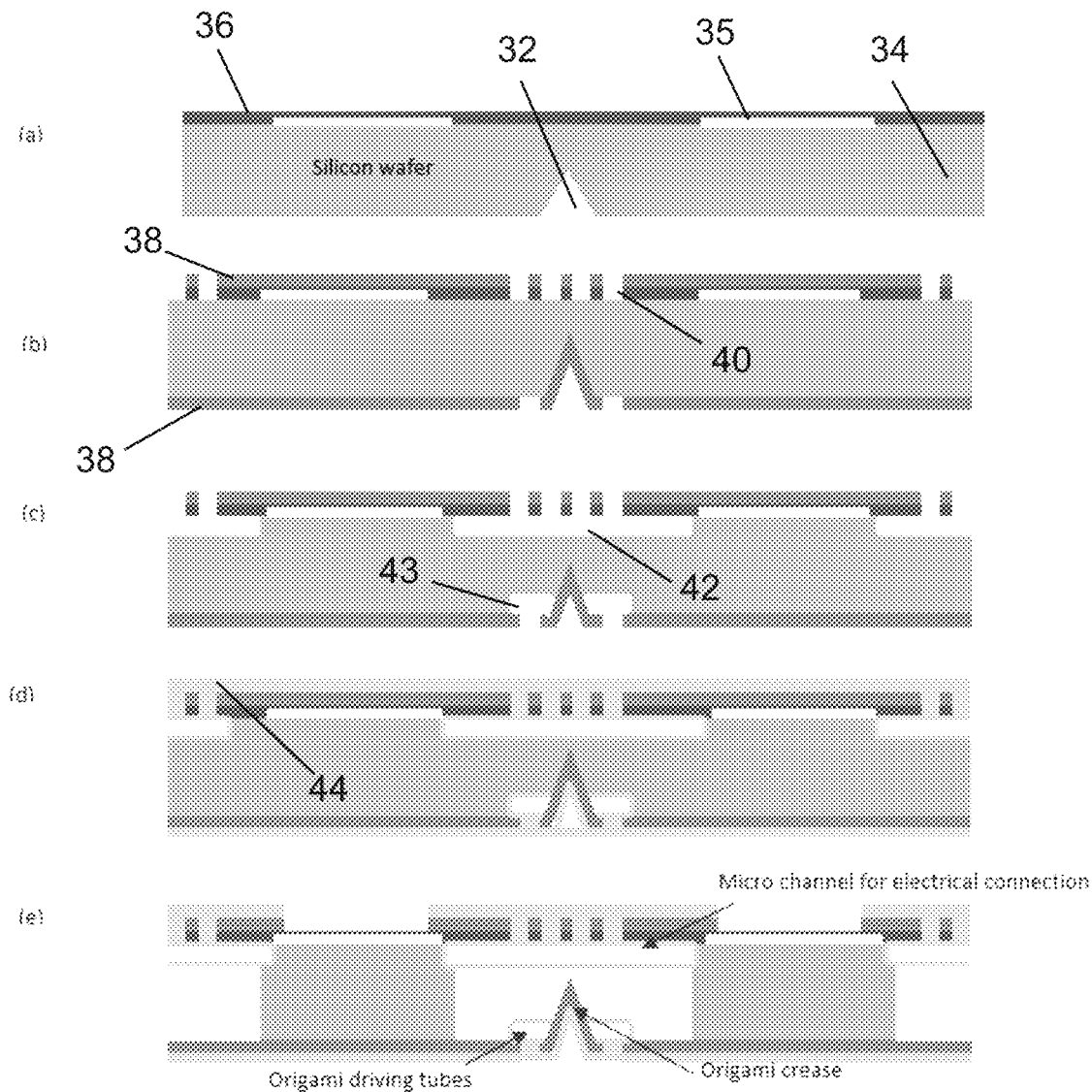
FIG. 6 is a diagram illustrating the steps of a method for forming a connection member according to one aspect of the invention.

FIG. 6 illustrates a method of forming an origami enabled manufacturing system 10, wherein a silicon wafer 34 functions as the substrate. In one aspect, the silicon wafer 34 can have a thickness of, for example 300 µm. On a back surface of the wafer 34, at least one groove 32 can be defined having a groove depth of, for example 100 µm, as shown in step (a). In one aspect, the groove 32 can be patterned and etched by different approaches and chemicals, such as, for example and without limitation, tetramethylammonium hydroxide (TMAH). On a front surface of the wafer 34, an oxide layer 35 can be patterned using photolithography and a buffered oxide etch (to about 0.5 µm in thickness), and a metal layer (e.g., an aluminum layer) 36 having a thickness of, for example, 220 nm, can be evaporated and patterned on the top surface. In step (b), a first layer 38 of polymer, such as for example and without limitation, parylene C, having a thickness of about 5 µm is deposited on top of the metal layer 36, as well as on the bottom surface of the wafer 34 using a vapor deposition method. As can be appreciated, parylene C is the generic name of poly-para-xylylene, which can be conformably deposited at room temperature with optimal mechanical and other properties. In one aspect, the parylene C layers 38 and the metal layer 36 can then be patterned by forming small holes 40 in a row along the intended center of a parylene channel. In one aspect, the holes 40 defined in the parylene C can serve as a mask for $XeF_2$ to etch a portion of the substrate. For example, the $XeF_2$ can etch a portion of the substrate to form at least one channel trench and/or tube 42 by undercutting the silicon substrate, as illustrated in step (c). In an aspect, at least one upper channel 42 can include a plurality of trenches and/or tubes defined underneath the metal layer (e.g., aluminum layer) 36. In an aspect, at least one lower channel 43 can be a plurality of trenches and/or tubes defined on a bottom surface of the substrate 16 proximate a side edge of the functional body that forms a crease in the predetermined pattern (e.g., a desired origami pattern). In an aspect, at least one upper channel 42 can be a plurality of trenches and/or tubes defined on a top surface of the substrate proximate a side edge of the functional body that forms a crease in the predetermined pattern. The plurality of upper and lower channels can be parallel to the plurality of side edges of the plurality of functional bodies. In an aspect, at least a portion of the plurality of upper channels 42 can underlie at least a portion of the at least one connection member 14, and each of the plurality of lower channels 42 can underlie each of the plurality of upper channels. In an aspect, the plurality of upper channels and the plurality of lower channels are selectively filled with air at a select air pressure. The air pressure in the upper and lower channels can be different. As illustrated in step (d), after the $XeF_2$ etch, a second polymer (for example, parylene C) layer 44 can be then deposited onto the substrate 16, conformally coating the trench and/or tube 42 and sealing the access holes 40 defined in the first layer 38 of parylene. In one aspect, the second and/or first parylene layer can then be patterned by oxygen plasma to shape the outline of the device and open contact pads. In another aspect, front side deep reactive ion etching (DRIE) and $XeF_2$ can finish the process by defining individual silicon functional bodies 12 and releasing the parylene electric connections and creases for origami, as illustrated in step (e).

Another structure used to manufacture a stretchable and deformable electronic device is the origami driving tube 42 attached to origami creases. In one aspect, these tubes can have two sets and each set can connect together. In use, air pressure or vacuum pressure can be introduced into these tubes and can provide a driving force to bend the crease up or down.

Figure 7:
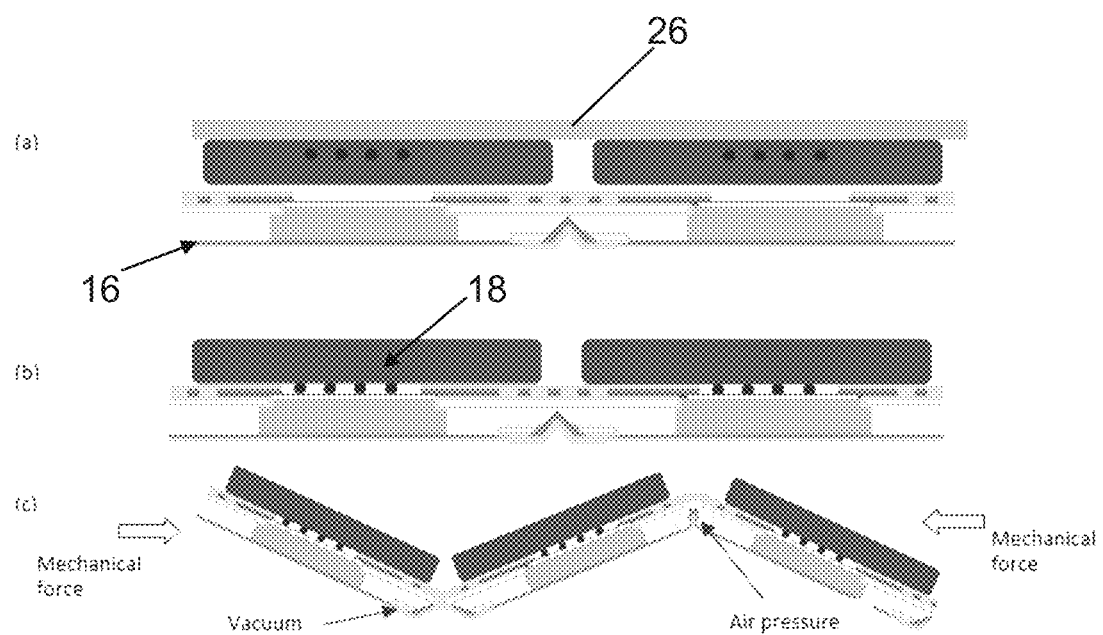
FIG. 7 is a diagram illustrating the steps for coupling the connection member of FIG. 6 to a functional device according to one aspect of the invention.

After the substrate 16 has been formed and etched as desired, the functional electronic device 18 and the substrate 16 can be aligned and brought together as illustrated in FIG. 7, steps (a) and (b). In one aspect, flip-chip bonding and/or other low temperature bonding (such as screen printing conductive epoxy bonding) can be performed to couple the device 18 to the substrate 16. Any handling surface 26 for holding the device can be removed by etching and/or other methods.

In one aspect, air pressure and/or vacuum pressure can be introduced into the tubes attached to the crease region to induce folding around the crease. For example, air pressure and/or vacuum pressure can cause a first functional body 12 to be positioned at an angle of about 20 to 30 degrees relative to a second functional body. In another aspect, a lateral mechanical compressive force can further induce folding to finish the origami folding, as illustrated in step (c). Once the origami folding is formed, air pressure and vacuum can be removed, since the folding in the polymer can retain the shapes.

This process as described herein can be scalable for mass production. The process also not only allows the integration of multiple functional devices, but also enables easy self-assembly of the origami. Specifically, asymmetries in the polymer tubes can be created in either or both of vertical and horizontal directions. By taking advantage of these asymmetries, pneumatic pressure or vacuum pressure can be applied to the channels and/or tubes to realize self-folding of the origami structure with pre-defined patterns. Furthermore, bi-stable buckling cable structures can be fabricated that allow maintenance of the folded state even after the external force is removed.

Transformative applications can be achieved when the uniqueness of origami, for instance, foldability and compactness, are integrated with functions of rigid devices. In order to develop a universal, robust, low-cost and scalable manufacturing technology by integrating origami and functional devices, foldable origami patterns can be integrated with devices in a scalable mechanism, and reliable connecting members can be positioned between functional pieces on each flat origami surface that tolerates creasing, folding, and other deformations. Once the foldable origami patterns are integrated with devices, upon folding, the functional body is not deformed, but rather is displaced due to the folding process. As shown in FIGS. 2, 5 and 7, the folding process brings the functional bodies 12 closer together, effectively making the overall product more compact.

The origami enabled manufacturing system 10 can be used in a variety of applications. For example, flexible, stretchable, foldable, and deformable electronics can be formed. The flexible electronics formed from the origami enabled manufacturing system can be formed of conventional plastic materials (used alone or in combination with elastic materials) that can be compatible with particular industry standards and high volume manufacturing technology. Further, flexible electronics formed from the origami enabled manufacturing system of the invention can easily be scaled up, are low cost, and are robust when compared to conventional systems. Flexible electronics formed from the origami enabled manufacturing system can be used, for example, in energy storage and source (e.g. battery, solar cells and supercapacitors), consumer products (e.g. foldable displays, illumination, antenna and foldable toys), wearable electronics (e.g. health monitoring system and communication system), industrial fabrication processes (chip packaging, system packaging) and the like. The origami enabled manufacturing system 10 of the invention can make these products more compact, portable and durable without sacrificing performance.

As an example, the origami enabled manufacturing system 10 can be used to improve the capacity of batteries. Conventional energy storage devices such as lithium ion (Li-ion) batteries can be considered two-dimensional (2-D) devices. The origami enabled manufacturing system 10 can be used to increase the energy per unit area such that batteries can be used for devices that have a limited area, such as for on-chip power. To maintain the same energy of the battery at a decreased footprint area, three dimensional (3-D) battery designs can be realized by implementing the disclosed methods and systems. For example, by employing the origami designs disclosed herein, an optimized conventional Li-ion battery structure can be folded to form a compact structure, which improves energy density (based on area) without using complicated electrode geometries. For example, battery arrays (e.g., devices shown in FIG. 5(A)) can be fabricated and bonded with origami patterns following the processes described herein.

Another advantage of the origami enabled manufacturing system 10 is that after manufacturing of high performance functional materials and devices on a planar surface, the planar system can become a three dimensional system which can improve the performance by increasing the actual surface area for a given planar surface area.

Another advantage of the origami enabled manufacturing system 10 is that it does not involve elastomeric materials and can be compatible with a mainstream CMOS process for high-performance devices. The systems and methods can be readily applied to other functional devices, ranging from sensors, displays, antennas, and energy storage devices. The systems and methods can be seamlessly integrated with mature microelectronics processes to fabricate functional devices that are able to survive combined stretching, compression, bending and torsion, in the planar state or the curvilinear state, or both planar and curvilinear states, with unseen functionalities. An example is origami-enabled silicon solar cells which have demonstrated that solar cells can reach up to 644% areal compactness while maintaining reasonably good performance upon cyclic folding/unfolding.

The disclosed origami enabled manufacturing systems and methods can utilize mainstream processes to fabricate high performance stretchable electronics. For example, high-performance functional devices can be fabricated on rigid surfaces without experiencing large strain during deformation, and rigid surfaces can be joined by connection members (e.g., serpentine-shaped flexible polymers) that allow for a full-degree folding and unfolding, which can enable deformability. As an example, origami enabled stretchable solar cells with metal traces embedded in serpentine-shaped flexible polymers, which function as connection members, can be fabricated to achieve unprecedented deformability. In an aspect, to bear localized strain at the creases, hollow tubes can be used with connection members as cushions to minimize the strain at folding creases.

Figure 10:
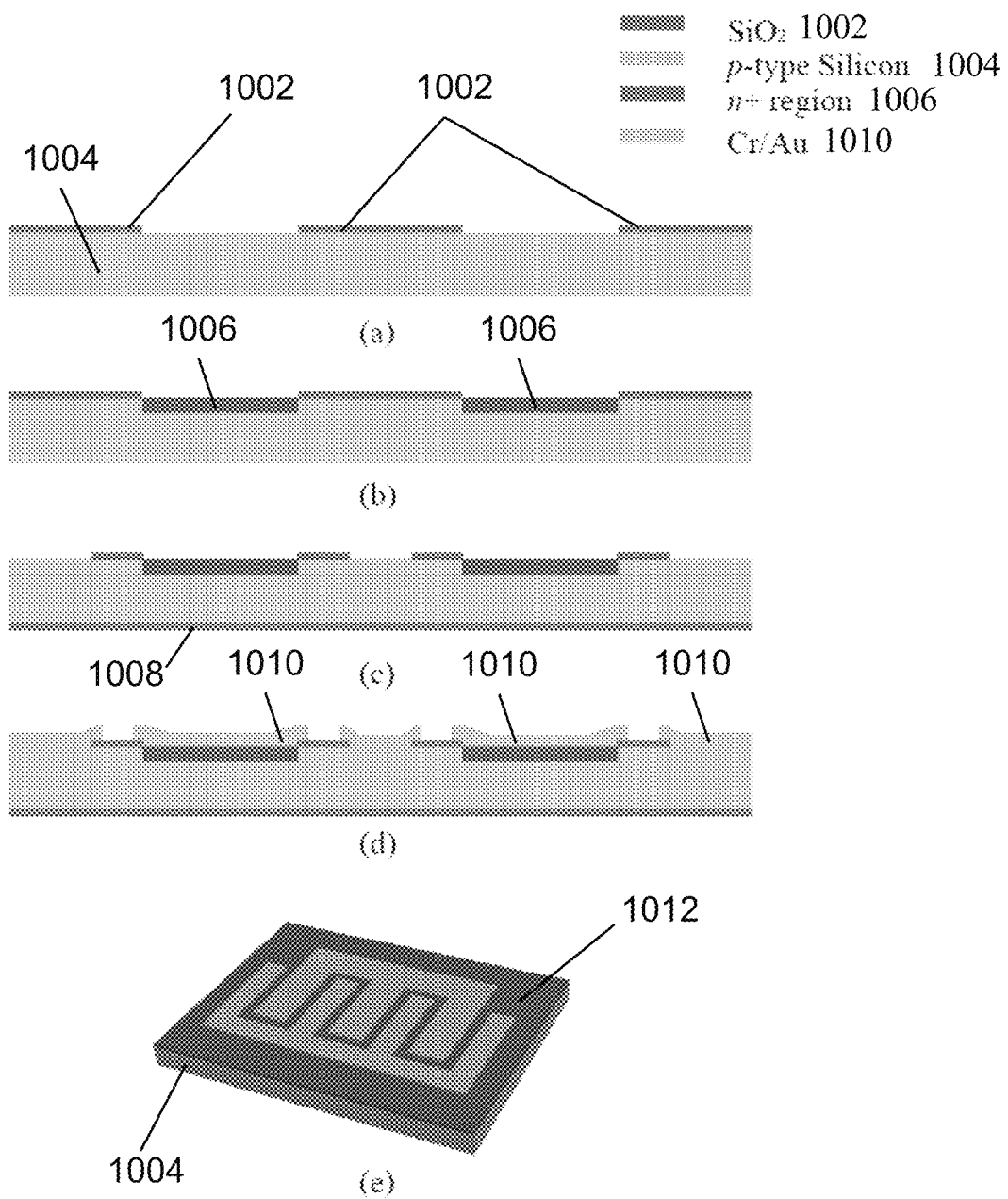
FIG. 10 is a diagram illustrating an exemplary fabrication process of an exemplary solar cell according to one aspect of the invention.

Such fabrication processes may include two processes, fabrication of an origami enabled solar cell structure (FIG. 8) and fabrication of alternative (Si) solar cells (FIG. 10).

Figure 8:
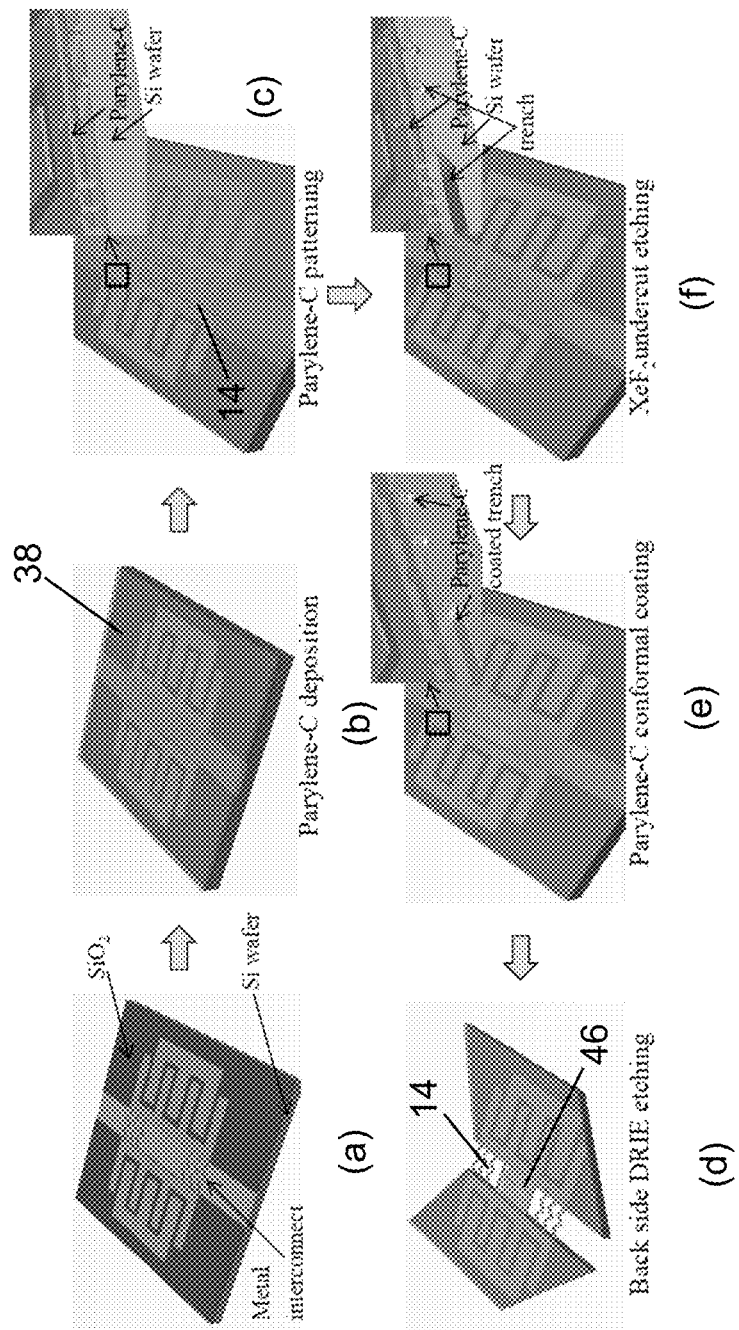
FIG. 8 is a diagram illustrating the steps of an exemplary method for forming origami enabled stretchable silicon solar cells according to one aspect of the invention.

In an aspect, the fabrication of the Si solar cells illustrated in FIG. 8 can be a standard process and compatible with mainstream CMOS processes. FIG. 8 shows two devices 18 (Si solar cells) fabricated on a Si substrate 34, and two sets of serpentine shaped connection members 14 on top of the Si wafer 34 that can be utilized to connect the two Si solar cells 18. In one aspect, the two fabricated Si solar cells 18 can be attached to a $SiO_2$ surface 48, as illustrated in step (a). Then, a first Parylene-C layer 38 (poly-para-xylylene) can be vapor-phase deposited using a Parylene deposition system, as shown in step (b). Parylene-C can be conformally deposited at room temperature. The first Parylene-C layer 38 can be then patterned using oxygen plasma to open small rectangular windows (e.g., 10 μm×50 μm in size and 10 μm apart between two windows) in rows along a central line of serpentine connection members 14. As shown in step (c), metal traces can be embedded in the Parylene-C connection members 14. In an aspect, back illumination can be used. In addition to patterning along connects, Parylene-C in the central area between Si solar cells 18 can also be patterned, which can form "a Parylene-C belt" 46 to enhance the mechanical integrity of the solar cells with creases. These patterned windows in Parylene-C can serve as masks for xenon difluoride (XeF$_2$) etching, a gas-phase isotropic Si etchant, as shown in step (d). The Si substrate 34 can then be undercut etched through these windows by XeF$_2$, forming trenches 42 underneath the connection members 14 and "Parylene-C belt" 46, as shown in steps (e) and (f). These trenches can function as cushions to reduce localized stress at the connection members 14 (e.g., serpentine structures). In an aspect, deposition of a second layer of Parylene-C (15 μm in thickness) can then be conducted to conformally coat the trenches and form sealed Parylene-C microtubes underneath connection members 14 and "Parylene-C belt"46, as shown in step (e). The second layer of Parylene-C can be patterned by oxygen plasma to shape the outline of the device and open contact pads, followed by an etching method (e.g., backside deep reactive-ion etching (DRIE)) using a photoresist as mask to release the origami Si solar cells) as shown in step (f).

Figure 9A:
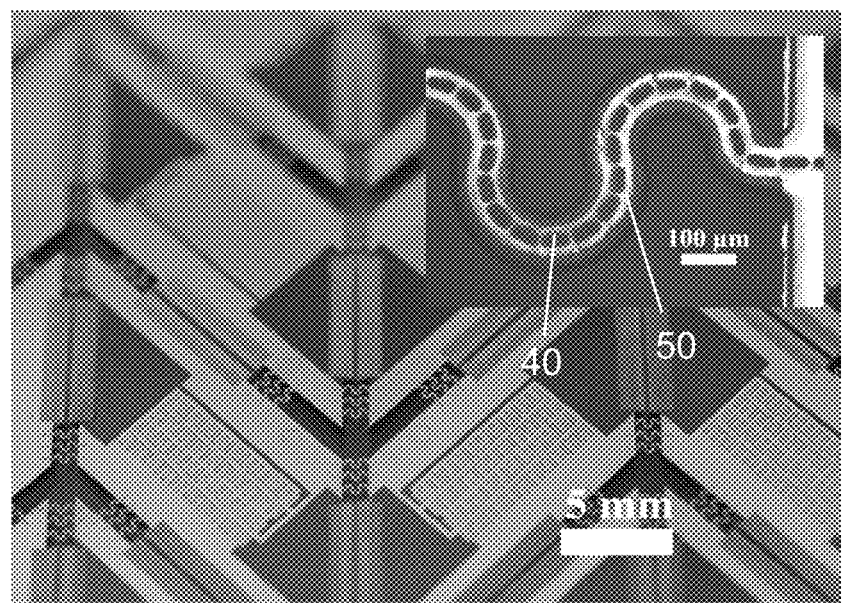
FIGS. 9A-B are optical photographs of fabricated origami enabled silicon solar cells, whereby
Figure 9B:
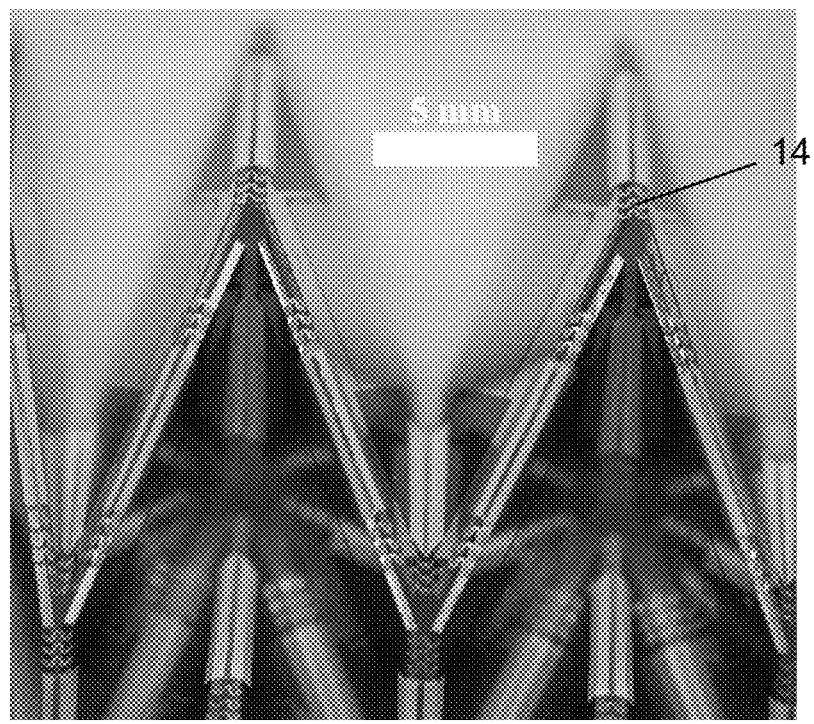

FIGS. 9(A)-(B) are photographs showing fabricated solar cells at unfolded (FIG. 9(A)) and folded (FIG. 9(B)) states. The solar cells can include twenty (20) parallelograms that are electrically linked by metal traces embedded in serpentine connection members. FIG. 9(A) shows an unfolded state with an inset of an optical micrograph of the serpentine connection member. The size of each parallelogram is 1 cm$^2$ and the slit is 0.1 cm in width. On each parallelogram, the solar cell covers 0.2 cm$^2$, which leads to 20% areal coverage, which can be significantly improved by optimized solar cell layout design. It is expected that 90% areal coverage can be reached. In the inset of FIG. 9(A), etching holes 40 for XeF$_2$ undercut etching are shown as dark spots, and the bright regions are gold traces 50 due to reflection of light. The Parylene-C layer that encapsulates the metal traces cannot be clearly seen because of its transparency. FIG. 9(B) shows a partially folded state and an optical micrograph as the inset confirms that the serpentine connection members can survive during folding.

FIG. 10 is a block diagram of an exemplary fabrication process for a silicon-based solar cell. The fabrication process initiates with deposition of a thin layer of silicon dioxide (SiO$_2$) 1002 having 0.2 μm thickness by lower pressure chemical vapor deposition (LPCVD) on a 380 μm-thick p-type single crystalline silicon (Si) wafer 1004. A patterned SiO$_2$ layer is formed through buffered oxide etch (BOE) using a photoresist as mask, as shown in step (a). The Si wafer 1004 is then implanted with phosphorous to form then + region 1006 using the patterned SiO$_2$ layer 1002 as the mask, as shown in step (b). The Si wafer 1004 can be annealed in a flow of dry N$_2$ for 30 minutes at 900° C. to form a 0.5 μm-deep p-n+ junction (not shown). Step (c) illustrates the removal of SiO$_2$ from potential sites of metal contacts through BOE for about 10 minutes, followed by application of an antireflection coating of SiO$_2$ 1008 (75 nm in thickness) on the back side of the wafer 1004 by plasma-enhanced chemical vapor deposition (PECVD). Finally, metal contacts 1010 can be applied to the wafer using electron-beam evaporation of Cr/Au 54 (10 nm/200 nm in thickness) and metal interconnects can be formed between adjacent Si solar cells, as shown in step (d). Step (e) illustrates a fabricated Si solar cell 1012 on Si wafer 1004.

The stretchability of origami based solar cells is defined by linear compactness $\varepsilon_{Linear}$ and areal compactness $\varepsilon_{Areal}$ the dimensions:

$$\varepsilon_{Linear}^x = \frac{L_x}{l_x} \text{ for } x\text{-direction}, \quad \varepsilon_{Linear}^y = \frac{L_y}{l_y} \text{ for } y\text{-direction}, \quad (1)$$

$$\varepsilon_{Areal} = \frac{L_x L_y}{l_x l_y} = \varepsilon_{Linear}^x \varepsilon_{Linear}^y. \quad (2)$$

Lx and Ly are dimensions for the completely unfolded state in x- and y-directions (as shown in FIG. 10), respectively; and their counterparts for the completely folded states are denoted by lower case letter "l." These measured dimensions demonstrate that the origami-based solar cells have realized up to 530% linear compactness in x-direction and 644% areal compactness.

One aspect of the invention is the employment, design and fabrication of the integrated serpentine-shaped connection member. Preferably, the connection member is an integrated three-dimensional connection in a defined shape suspended in the air to connect the island structures (functional bodies). The serpentine connection member presents great flexibility and stretchability, which provides deformability to the whole system. The suspension in the air frees the connection member from constraints, which provides for the reliability of the whole system. Although the connection member is described as substantially "S" or serpentine-shaped, it should be understood that the description encompasses other similar shapes such as, "V," "U," "C," horse shoe, zigzag, spiral and the like. The serpentine shape contains self-similar patterns and rounded joints, such that it allows the connection member to be compressed or stretched or twisted, thus imparting deformability to the final electronic device.

In one embodiment, the functional bodies are displays, such as liquid crystal displays (LCDs), light emitting diode (LED) displays, organic light emitting diode (OLED) displays, thin film displays, etc. Those displays are connected by one or more flexible interconnects to form a foldable display structure. For example, the display functional bodies form rigid portions containing pixels for visual display, while the flexible interconnects form crease portions between rigid areas to allow for folding or stretching of the overall structure.

Figure 11:
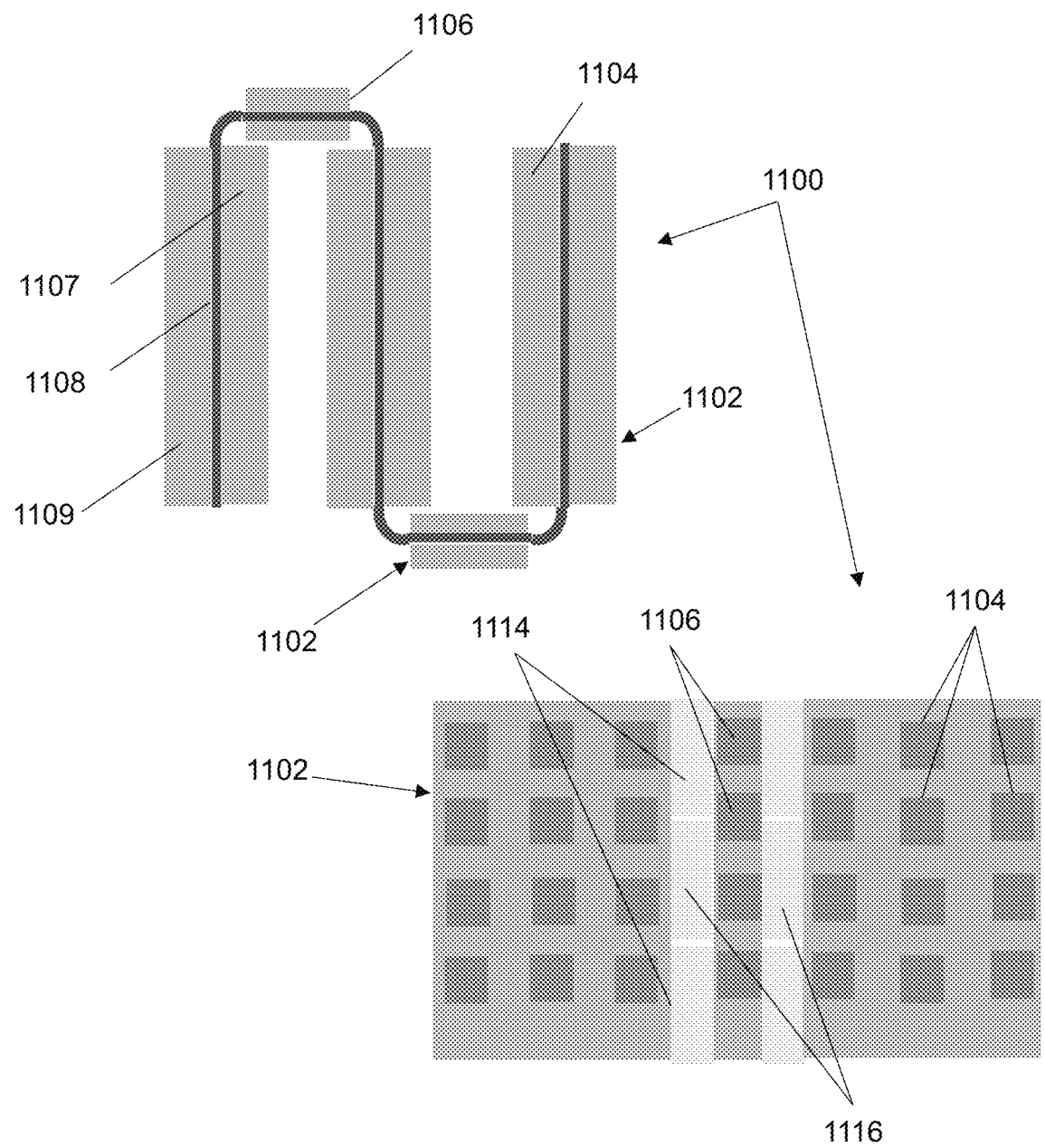
FIG. 11 is top view drawings of an origami display in a folded position and an unfolded position according to one aspect of the invention.

An exemplary origami-formed display structure 1100 is illustrated in FIG. 11. The display structure 1100 is generally formed of at least one rigid portion 1102 on which the pixilated display portions 1104, 1106 are positioned. The pixilated displays portions 1104, 1106 may be formed by sandwiching a display circuit 1108 between a top substrate layer 1109 and a bottom substrate layer 1107 to provide mechanical strength and integrity to the display. The display circuit 1108 may be made using any methods known in the art for forming LCD, LED, OLED, or other thin film displays. The substrate layers 1107, 1109 may be constructed from elastomer or non-elastomer materials, such as glass, quartz, silicon, polydimethylsiloxane (PDMS) (elastomer) or poly(p-xylylene) (e.g., Parylene C (non-elastomer)), and other polymers. The substrate layers 1107, 1109 may be applied using two methods. In one method, an uncured encapsulation material, such as those disclosed above, may be coated onto the top and bottom surfaces of the display circuit 1108 and then cured, such as by heating. In a second method, an uncured encapsulation material may be applied as a film to a separate substrate (not shown), cured (e.g., heated), and peeled off the substrate. The encapsulation film is then attached to the top and bottom surfaces of the display circuit 1108. Using either method, the encapsulation layers' thickness may be tens of microns to several millimeters, depending on the use for a particular application.

The pixilated displays may be formed of main display pixel portions 1104 or connection display pixel portions 1106. Main display pixel portions 1104 contain normal display structure having a normal thickness of 20 μm and above. Connection display pixel portions 1106 are typically thinner than main display pixel portions 1104 and contain specially designed pixel patterns and structures that allow the display to be creased or folded at its edge. Each of the main display pixel portions 1104 and connection display pixel portions 1106 may have different sizes depending on the location of the individual rigid portions 1102. For example, FIG. 11 illustrates the main display pixel portions 1104 forming larger rigid portions 1102 and the connection display pixel portions 1106 forming smaller rigid portions 1102. Electrical wire connections 1114 (or "interconnects") may be provided that deliver power to the display structure 1100 and control the display structure's 1100 circuits. These are positioned between the rigid portion(s) 1102 and may be folded or creased. Mechanical enhancing structures 1116 are also provided between the rigid portions(s) 1102 and may be folded or creased. The mechanical enhancing structure 1116 may be fabricated by coating additional foldable polymer layers on the display circuit to prevent the breaking of crease during folding display. In one embodiment, the amount of folding between the rigid portions 1102 may be 60 degrees, 90 degrees, or even up to 180 degrees depending on the mechanical capability and structure design of the display structure 1100 and the needs of the particular application. This configuration is only an example and different configurations may be used to achieve the desired final overall structure.

Figure 12:
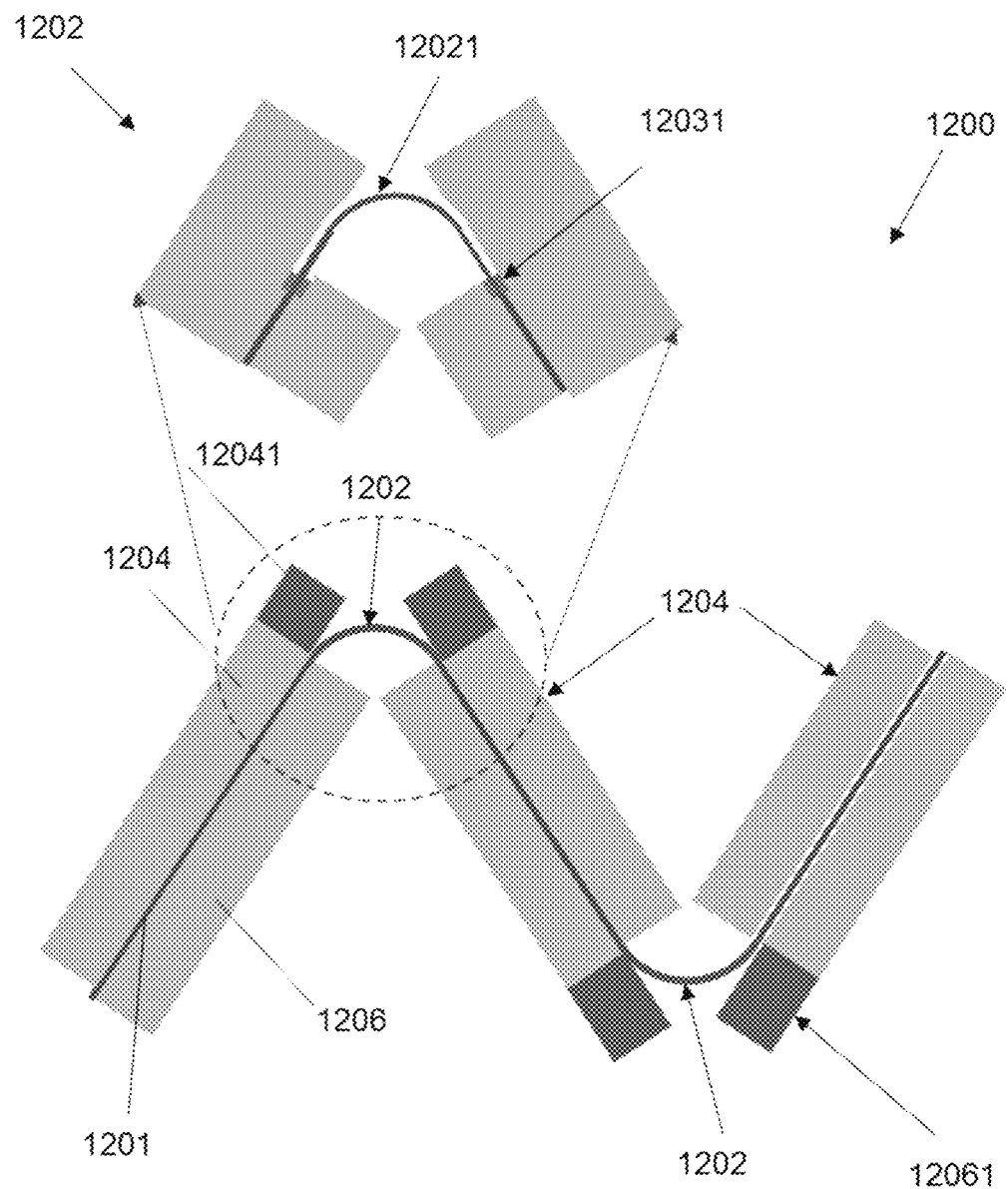
FIG. 12 is a top view drawing of a folded origami display according to one aspect of the invention.

Another embodiment of an origami display structure 1200 is illustrated in FIG. 12. In this particular embodiment, the display structure 1200 is an OLED display. In this case, the creased portions 1202 may be protected with an abutting top encapsulation layer 12041 or an abutting bottom encapsulation layer 12061, but not both. If a creased portion 1202 is to be folded toward the bottom encapsulation layer, the top encapsulation layers are constructed such that it they are in an abutting relationship when the display is in a flat position. Similarly, if a creased portion 1202 is to be folded toward the top encapsulation layer, the bottom encapsulation layers are constructed such that they are in an abutting relationship when the display is in a flat position. In this embodiment, the display layers 1201 are very thin (at the micron level), which makes the display structure 1200 preferable for use as a folded display. In one embodiment, an air and moisture tight sealing 12031 is applied to protect the display layers 1201. Additionally, a thin folded or laminate material 12021 formed of poly(p-xylylene), polytetrafluoroethylene, or other organic polymer material, for example, is applied to the creased portions for further mechanical protection. Alternatively, the creased portions 1202 may also include wire connections and/or mechanical strength enhancing structures (not shown) similar to those illustrated in FIG. 11.

Figure 13A:
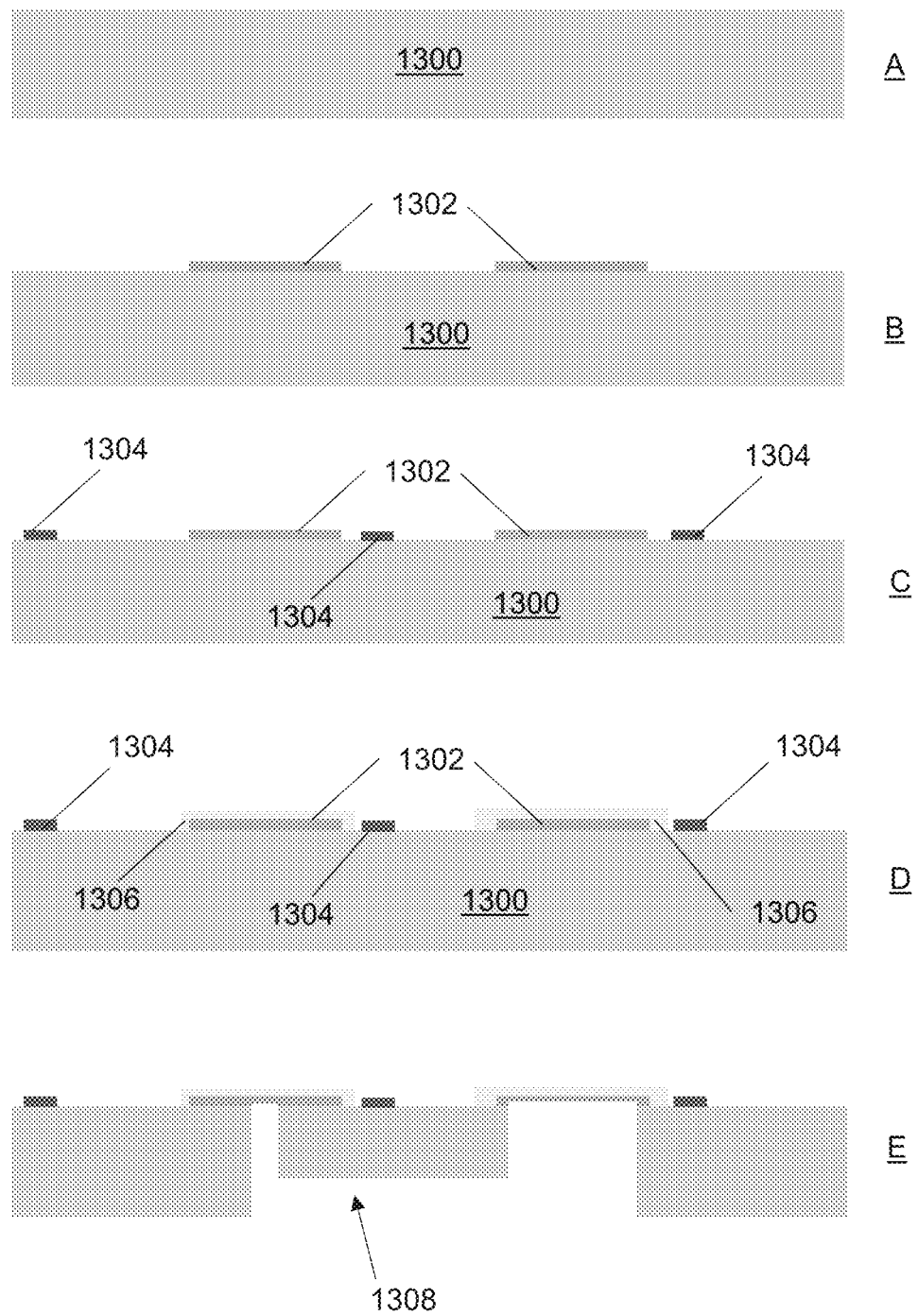
FIGS. 13A-B are diagrams illustrating the steps for manufacturing an origami display according to one aspect of the invention.
Figure 13B:
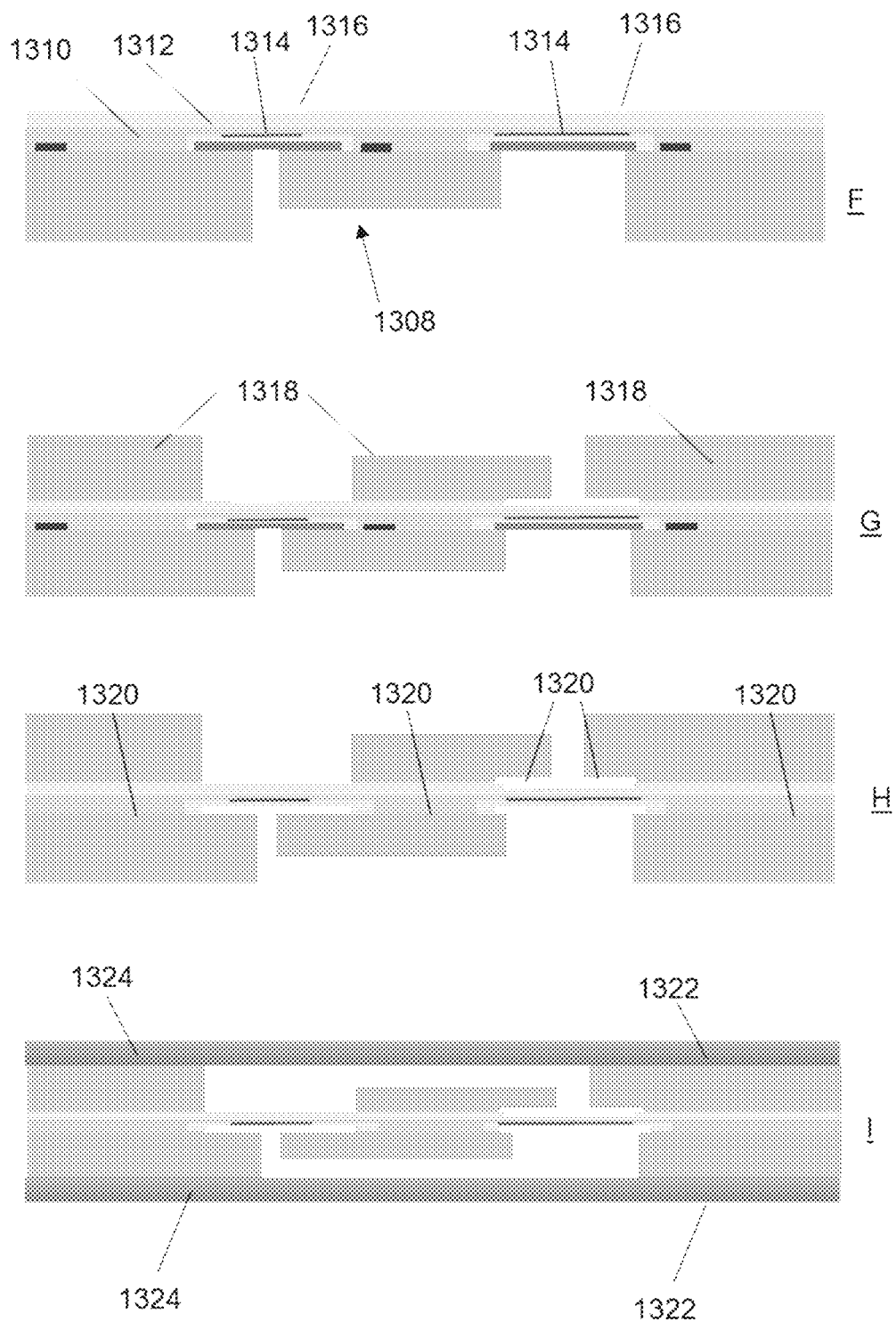

FIGS. 13A-B are diagrams illustrating a method for making a foldable display structure, such as those described herein. Referring to FIG. 13A, a substrate 1300 formed of, for example, quartz, glass, plastic, or other type of organic or inorganic material, is first provided in Step A. Next, a sacrificial material layer 1302 (e.g. silicon) is casted and patterned onto the substrate 1300 over an area where the crease portions will be formed, as set forth in Step B. Control and driving circuits 1304, such as thin film transistors, are then deposited or fabricated on the substrate 1300 in Step C. Foldable layers 1306 are then produced (may have an air-tight or moisture-tight sealing function) at the creased regions using materials such as, for example, of poly(p-xylylene), polytetrafluoroethylene, and the like, as shown in Step D. The creased regions 1308 are then formed by thinning down (by etching, cutting, or grinding) the substrate 1300 to reach the silicon layers, under Step E. Other appropriate regions (e.g. connection pixel regions) may also be thinned to desired design thicknesses. The steps of the process continue in FIG. 13B. Next, the display layers 1310, sealing layers 1312 (if any), wire connections 1314, and mechanical strength enhancing structures 1316 at the crease regions 1308 are fabricated on the substrate, at Step F. A top substrate 1318 is then bonded to the structure 1300 at the rigid portions, as set forth at Step G. The bonding is preferably accomplished with an adhesive (e.g. epoxy or thermal bonding). The sacrificial layer is then removed from the areas labeled 1320 (e.g. by $XeF_2$ etching) to release the displays at Step H. Finally, at Step I, the display structure 1300 is packaged with encapsulation layers 1322 (e.g. elastomer or non-elastomer) to ensure mechanical integrity.

Figure 14:
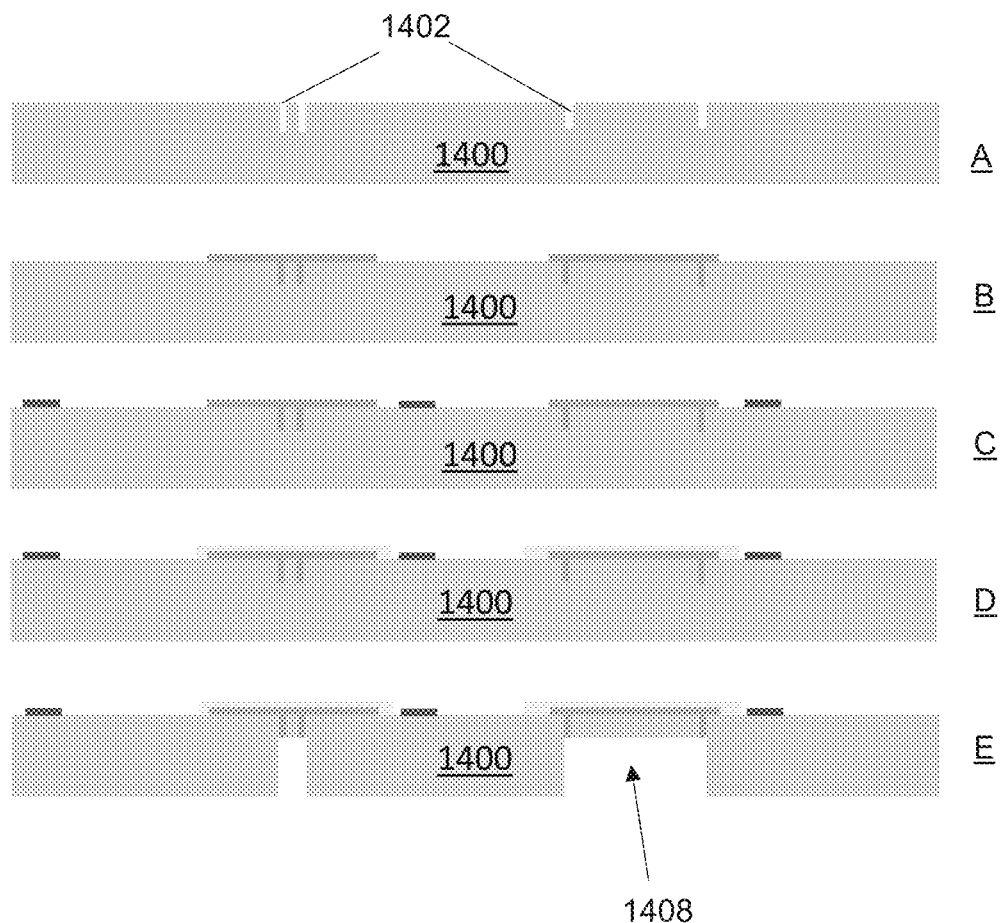
FIG. 14 is a diagram illustrating a portion of the steps for manufacturing an OLED origami display according to one aspect of the invention.

FIG. 14 depicts steps similar to Steps A-E of FIG. 13. Here, however, trenches 1402 are formed on the substrate 1400 in Step A prior to the patterning of the sacrificial material layer thereon in Step B. The remainder of the steps are the same as those illustrated in Steps B-I of FIG. 13. The trenches 1402 preferably have a width of about 2-4 microns. The trenches' 1402 function is to ensure the substrate 1400 has sufficient thickness in the creased region 1408 underneath the silicon, so that the creased region 1408 will be stronger and more reliable during the fabrication process, as compared to the method of FIG. 13. However, because the formation of trenches 1402 adds steps to the manufacturing process, which increases manufacturing times and costs, the method set forth in FIG. 13 is also still advantageous.

Figure 15:
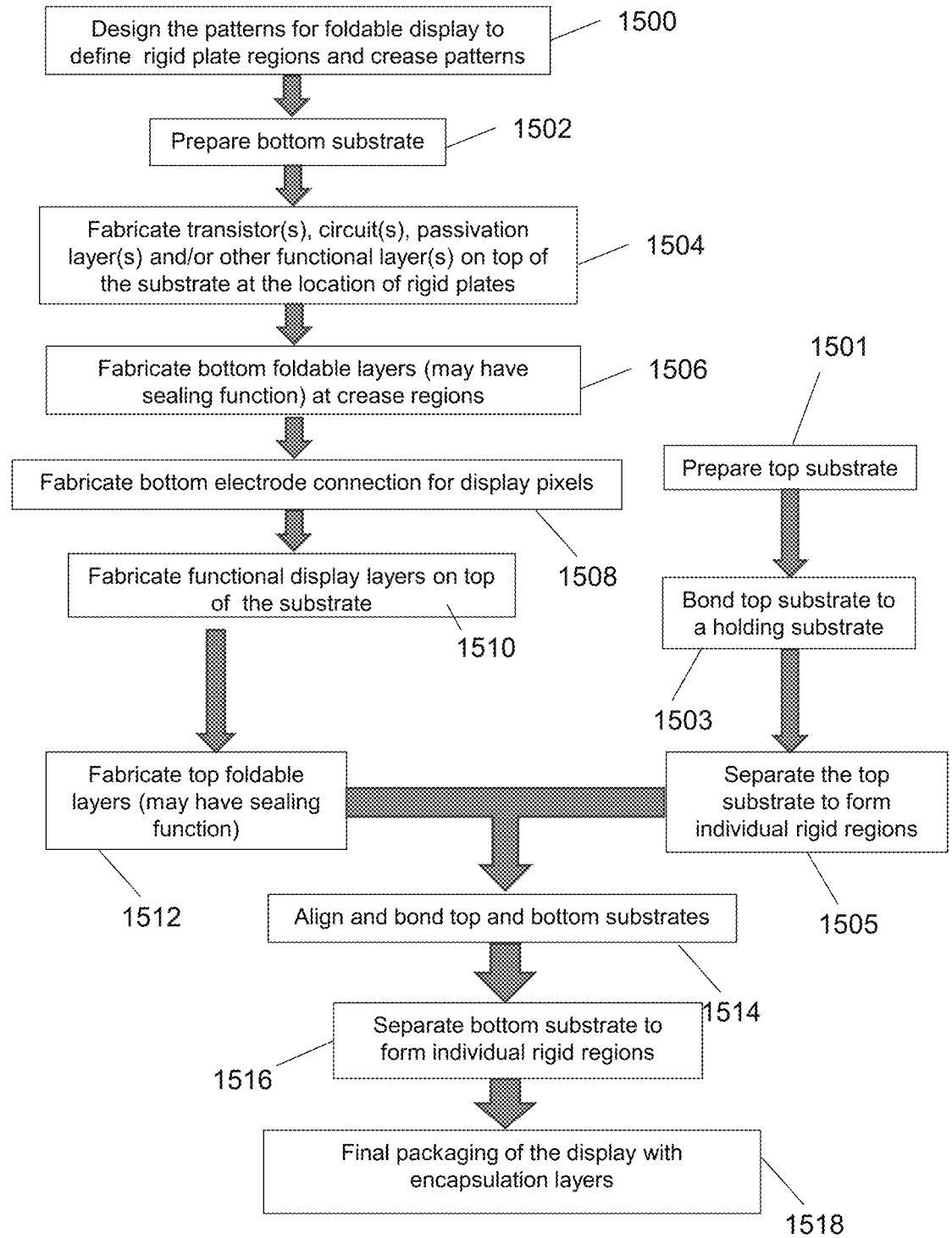
FIG. 15 is a flow diagram of a process for manufacturing an origami display according to one aspect of the invention.

FIG. 15 is a flow diagram outlining the processes depicted if FIGS. 13-14. The method essentially includes two parallel processes: 1) fabricating the bottom substrate, the functional layers on the bottom substrate, and the flexible folding layer; and 2) fabricating the top substrate. The two parallel processes are then combined by bonding the top substrate to the bottom substrate.

Specifically, in Step 1500, the patterns for the foldable display are designed in order to define where the rigid plate regions and creased regions will be positioned. In Step 1602, the bottom substrate is prepared as set forth herein. Next, transistor(s), circuit(s), passivation layer(s), and/or other functional layer(s) are fabricated on the top of the substrate at the location of the rigid plates, as set forth in Step 1604. In Step 1606, the bottom foldable layer(s) are fabricated at the creased regions. The bottom foldable layer(s) may have a sealing function, as set forth above. In Step 1508, the bottom electrode connection for the display pixels is fabricated. Next, the functional display layer(s) are fabricated on top of the substrate, as set forth in Step 1510. In Step 1512, the top foldable layer(s), which may have a sealing function, are fabricated. Simultaneously with Steps 1600-1612, the top substrate is prepared, as set forth in Step 1501. The top substrate is then bonded to a holding substrate, as in Step 1503. Next, in Step 1605, the top substrate is separated from the holding substrate to form the desired rigid plates. Then, in Step 1514, the top and bottom substrates (e.g., substrates 1109 in FIG. 11, substrates 1204, 1206 in FIG. 12, substrates 1300, 1318 in FIG. 13, and substrate 1400 in FIG. 14) are aligned and bonded together. The bottom substrate is then separated from the top substrate to form the display, as in Step 1516. Lastly, in Step 1518, the display is packaged with encapsulation layer(s) and at least one mechanical frame, as set forth herein. The top and bottom substrates provide the mechanical support and encapsulation for the display in rigid regions.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer. The components of the computer can comprise, but are not limited to, one or more processors, a system memory, and a system bus that couples various system components including the processor to the system memory.

The methods and systems described above require no particular component or function. Thus, any described component or function—despite its advantages—is optional. Also, some or all of the described components and functions described above can be used in connection with any number of other suitable components and functions.

Without further description, it is believed that one of ordinary skill in the art can, using the preceding description and the following illustrative example, make and utilize the present invention and practice the claimed methods. The following example is given to illustrate the present invention. It should be understood that the invention is not to be limited to the specific conditions or details described in this example.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. An origami-based flexible electronic display, comprising:
   a rigid substrate;
   a plurality of creases formed in the rigid substrate thereby forming an origami pattern of a plurality of rigid portions;
   a pixelated display portion attached to the plurality of rigid portions;
   at least one display circuit positioned on a top surface of the plurality of the rigid portions;
   a plurality of flexible serpentine-shaped interconnects in the creases and electrically connected to the at least one display circuit, wherein the plurality of serpentine-shaped interconnects are flexible and stretchable such that the plurality of rigid portions may be folded and stretched along the creases relative to one another according to the origami pattern;
   wherein each of the pixelated display portions form an overall visual display on the electronic display when unfolded from an origami-folded and compact size to a flat configuration.

2. The flexible electronic display of claim 1, wherein the at least one flexible serpentine-shaped interconnect comprises at least one conductor.

3. The flexible electronic display of claim 1, wherein the plurality of pixelated display portions comprises at least one of a liquid crystal display (LCD), light emitting diode (LED) display, an organic light emitting diode (OLED) display, or a thin film display.

4. The flexible electronic display of claim 1, further comprising
   a top encapsulation layer extending from a first pixelated display portion for covering a first flexible serpentine-shaped interconnect extending between a first rigid portion and a second rigid portion to partially cover the first flexible serpentine-shaped interconnect during a folding process;
   a bottom encapsulation layer extending from a second rigid portion for covering a second flexible serpentine-shaped interconnect extending between the first rigid portion and a third rigid portion to partially cover the second flexible serpentine-shaped interconnect during a folding process, and
   wherein the top encapsulation layer or the bottom encapsulation layer is formed of polydimethylsiloxane and/or poly(p-xylylene).

5. The flexible electronic display of claim 4, wherein the first rigid portion and the second rigid portion may be folded relative to one another at an angle of at least 60 degrees.

6. The flexible electronic display of claim 4, further comprising at least one mechanical enhancing structure positioned between the first rigid portion and the second rigid portion.

7. The flexible electronic display of claim 6, wherein the at least one mechanical enhancing structure is foldable.

8. The flexible electronic display of claim 7, wherein the at least one mechanical enhancing structure is formed of poly(p-xylylene) or polytetrafluoroethylene.

9. The flexible electronic display of claim 4, further comprising at least one air-tight or moisture-tight sealing layer applied to the at least one display circuit.

10. The flexible electronic display of claim 1, wherein a first rigid portion and a second rigid portion may be twisted relative to one another.

11. The flexible electronic display of claim 1, wherein the rigid substrate is a silicon wafer.

12. The flexible electronic display of claim 1, wherein at least a portion of the at least one display circuit extends over one of the creases.

13. The flexible electronic display of claim 1, wherein a first pixelated display portion is smaller than a second pixelated display portion.

* * * * *